(12) United States Patent
Haraguchi

(10) Patent No.: US 9,195,444 B2
(45) Date of Patent: Nov. 24, 2015

(54) COMPILER METHOD AND COMPILER APPARATUS FOR OPTIMIZING A CODE BY TRANSFORMING A CODE TO ANOTHER CODE INCLUDING A PARALLEL PROCESSING INSTRUCTION

(71) Applicant: FUJITSU LIMITED, Kawasaki-shi, Kanagawa (JP)

(72) Inventor: Masatoshi Haraguchi, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/634,988

(22) Filed: Mar. 2, 2015

(65) Prior Publication Data

US 2015/0277874 A1    Oct. 1, 2015

(30) Foreign Application Priority Data

Mar. 27, 2014 (JP) .................................. 2014-066929

(51) Int. Cl.
*G06F 9/45* (2006.01)
(52) U.S. Cl.
CPC ................ *G06F 8/443* (2013.01); *G06F 8/445* (2013.01)
(58) Field of Classification Search
CPC .................................. G06F 8/443; G06F 8/445
USPC ................................................. 717/151–161
See application file for complete search history.

(56) References Cited

U.S. PATENT DOCUMENTS

| 5,852,734 | A | 12/1998 | Komatsu et al. | |
|---|---|---|---|---|
| 7,076,776 | B2* | 7/2006 | Kim et al. | 717/160 |
| 7,284,241 | B2* | 10/2007 | Heishi et al. | 717/152 |
| 7,698,696 | B2* | 4/2010 | Ogawa et al. | 717/151 |
| 8,151,254 | B2* | 4/2012 | Heishi et al. | 717/151 |
| 8,418,157 | B2* | 4/2013 | Ogawa et al. | 717/151 |
| 8,688,957 | B2* | 4/2014 | Smelyanskiy et al. | 712/22 |
| 8,943,484 | B2* | 1/2015 | Arakawa et al. | 717/144 |
| 2003/0097653 | A1* | 5/2003 | Kim et al. | 717/160 |
| 2004/0025150 | A1* | 2/2004 | Heishi et al. | 717/154 |
| 2004/0098713 | A1* | 5/2004 | Ogawa et al. | 717/160 |
| 2007/0256065 | A1* | 11/2007 | Heishi et al. | 717/151 |
| 2010/0175056 | A1* | 7/2010 | Ogawa et al. | 717/151 |
| 2011/0067015 | A1* | 3/2011 | Takagi et al. | 717/149 |
| 2012/0159130 | A1* | 6/2012 | Smelyanskiy et al. | 712/216 |
| 2013/0262824 | A1* | 10/2013 | Arakawa et al. | 712/205 |
| 2013/0262835 | A1* | 10/2013 | Arakawa et al. | 712/220 |
| 2013/0262842 | A1* | 10/2013 | Chiba et al. | 712/226 |
| 2014/0007061 | A1* | 1/2014 | Perkins et al. | 717/150 |
| 2014/0101641 | A1* | 4/2014 | Staples et al. | 717/130 |

FOREIGN PATENT DOCUMENTS

| JP | 08-030561 | 2/1996 |
|---|---|---|
| JP | 08-101776 | 4/1996 |
| JP | 2013-080407 | 5/2013 |

* cited by examiner

*Primary Examiner* — Qing Chen
(74) *Attorney, Agent, or Firm* — Fujitsu Patent Center

(57) ABSTRACT

In a compiler apparatus, a memory unit stores a first code including a loop having a first arithmetic expression including a first variable that refers to a result of K iterations previous calculation. A transformation unit develops the first arithmetic expression into a second arithmetic expression not including the first variable, using a second variable that refers to a result of K+1 iterations or more previous calculation, compares an execution time for executing the loop on the basis of the first arithmetic expression with an execution time for executing the loop in which the calculations of Jth and J+Kth iterations of the loop are executed in parallel on the basis of the second arithmetic expression, and decides based on the comparison result whether to transform the first code into a second code including a parallel processing instruction for executing the Jth and J+Kth iterations in parallel.

5 Claims, 25 Drawing Sheets

FIG. 11

```
subroutine foo(a,b)
real(8),dimension(1:10000) :: a,b
do i=2,10000
    a(i) = a(i-1) + b(i)
enddo
end subroutine
```
231

```
subroutine foo(a,b)
real(8),dimension(1:10000) :: a,b
a(2) = a(1) + b(2)
a(3) = a(2) + b(3)
a(4) = a(3) + b(4)
do i=5,10000
    a(i) = a(i-1) + b(i)
enddo
end subroutine
```
232

```
subroutine foo(a,b)
real(8),dimension(1:10000) :: a,b
a(2) = a(1) + b(2)
a(3) = a(2) + b(3)
a(4) = a(3) + b(4)
do i=5,10000
    a(i) = (((a(i-4) + b(i-3)) + b(i-2)) + b(i-1)) + b(i)
enddo
end subroutine
```
233

```
subroutine foo(a,b)
real(8),dimension(1:10000) :: a,b
a(2) = a(1) + b(2)
a(3) = a(2) + b(3)
a(4) = a(3) + b(4)
do i=5,10000,4
    a(i:i+3) = (((a(i-4:i-1) + b(i-3:i))
                + b(i-2:i+1)) + b(i-1:i+2)) + b(i:i+3)
enddo
end subroutine
```
234

```
subroutine foo(a,b)
real(8),dimension(1:10000) :: a,b
a(2) = a(1) + b(2)
a(3) = a(2) + b(3)
a(4) = a(3) + b(4)
do i=5,10000
    a(i) = (((a(i-4) + b(i-3)) + b(i-2)) + b(i-1)) + b(i)
enddo
end subroutine
```
233
```
subroutine foo(a,b)
real(8),dimension(1:10000) :: a,b
a(2) = a(1) + b(2)
a(3) = a(2) + b(3)
a(4) = a(3) + b(4)
do i=5,10000
    a(i) = (a(i-4) + (b(i-3) + b(i-2))) + (b(i-1) + b(i))
enddo
end subroutine
```
235
```
subroutine foo(a,b)
real(8),dimension(1:10000) :: a,b
a(2) = a(1) + b(2)
a(3) = a(2) + b(3)
a(4) = a(3) + b(4)
do i=5,10000,4
    a(i:i+3) = (a(i-4:i-1) + (b(i-3:i) + b(i-2:i+1)))
                        + (b(i-1:i+2) + b(i:i+3))
enddo
end subroutine
```
236
FIG. 14

```
subroutine foo(a,b,n,m)
real(8),dimension(1:n) :: a,b
do i=2,m
    a(i) = a(i-1) + b(i)
enddo
end subroutine
```
241

```
subroutine foo(a,b,n,m)
real(8),dimension(1:n) :: a,b
if(m .lt. 7) goto 1000
    a(2) = a(1) + b(2)
    a(3) = a(2) + b(3)
    a(4) = a(3) + b(4)
    mm = (m/4)*4
    do i=5,mm,4
        a(i:i+3) = (a(i-4:i-1) + (b(i-3:i) + b(i-2:i+1)))
                              + b(i-1:i+2) + b(i:i+3))
    enddo
    is = i
    goto 2000
1000 continue
    is = 2
2000 continue
    do i=is,m
        a(i) = a(i-1) + b(i)
    enddo
end subroutine
```
242

```
do i=2,10000
    a(i) = a(i-1) + b(i)
enddo
```
231

⇓ (FOUR ITERATIONS)

| | COMPUTING UNIT 24 | COMPUTING UNIT 26 |
|---|---|---|
| | t10 = a(1) [.LABEL] | |
| 1 | t20 = b(i) | |
| 2 | | |
| 3 | | |
| 4 | t21 = b(i+1) | t30 = t10 + t20 |
| 5 | | |
| 6 | t22 = b(i+2) | |
| 7 | a(i) = t30 | t31 = t30 + t21 |
| 8 | | |
| 9 | t23 = b(i+3) | |
| 10 | a(i+1) = t31 | t32 = t31 + t22 |
| 11 | | |
| 12 | | |
| 13 | a(i+2) = t32 | t10 = t32 + t23 |
| 14 | | |
| 15 | | |
| 16 | a(i+3) = t1 | |
| 17 | | i = i + 4 |
| 18 | [branch.LABEL] | |

FIG. 17

```
do i=5,10000,4
    a(i:i+3) = (((a(i-4:i-1) + b(i-3:i))
                + b(i-2:i+1)) + b(i-1:i+2)) + b(i:i+3)
enddo
```
234

⇩

| | COMPUTING UNIT 24 | COMPUTING UNIT 25 | COMPUTING UNIT 26 |
|---|---|---|---|
| | [.LABEL] | | |
| 1 | ts1 = a(i-4:i-1) | ts2 = b(i-3:i) | |
| 2 | ts3 = b(i-2:i+1) | ts4 = b(i-1:i+2) | |
| 3 | ts5 = b(i:i+3) | | |
| 4 | | | ts6 = ts1 + ts2 |
| 5 | | | |
| 6 | | | |
| 7 | | | ts7 = ts6 + ts3 |
| 8 | | | |
| 9 | | | |
| 10 | | | ts8 = ts7 + ts4 |
| 11 | | | |
| 12 | | | |
| 13 | | | ts9 = ts8 + ts5 |
| 14 | | | |
| 15 | | | |
| 16 | a(i:i+3) = ts9 | | |
| 17 | | | i = i + 4 |
| 18 | [branch.LABEL] | | |

FIG. 18

```
do i=5,10000,4
    a(i:i+3) = (a(i-4:i-1) + (b(i-3:i) + b(i-2:i+1)))
                           + (b(i-1:i+2) + b(i:i+3))
enddo
```
236

| | COMPUTING UNIT 24 | COMPUTING UNIT 25 | COMPUTING UNIT 26 |
|---|---|---|---|
| | [.LABEL] | | |
| 1 | ts2 = b(i−3:i) | ts3 = b(i−2:i+1) | |
| 2 | ts4 = b(i−1:i+2) | ts5 = b(i:i+3) | |
| 3 | ts1 = a(i−4:i−1) | | |
| 4 | | | ts6 = ts2 + ts3 |
| 5 | | | ts7 = ts4 + ts5 |
| 6 | | | |
| 7 | | | ts8 = ts1 + ts6 |
| 8 | | | |
| 9 | | | |
| 10 | | | ts9 = ts8 + ts7 |
| 11 | | | |
| 12 | | | |
| 13 | a(i:i+3) = ts9 | | |
| 14 | | | i = i + 4 |
| 15 | [branch.LABEL] | | |

FIG. 21

```
do i=5,10000,4
    a(i:i+3) = (a(i-4:i-1) + (b(i-3:i) + b(i-2:i+1)))
             + (b(i-1:i+2) + b(i:i+3))
enddo
```
236

| | COMPUTING UNIT 24a | COMPUTING UNIT 25a | COMPUTING UNIT 26a |
|---|---|---|---|
| | [.LABEL] | | |
| 1 | ts2 = b(i-3:i) | ts3 = b(i-2:i+1) | |
| 2 | ts4 = b(i-1:i+2) | ts5 = b(i:i+3) | |
| 3 | ts1 = a(i-4:i-1) | | |
| 4 | | | |
| 5 | | | |
| 6 | | | ts6 = ts2 + ts3 |
| 7 | | | ts7 = ts4 + ts5 |
| 8 | | | |
| 9 | | | |
| 10 | | | |
| 11 | | | ts8 = ts1 + ts6 |
| 12 | | | |
| 13 | | | |
| 14 | | | |
| 15 | | | |
| 16 | | | ts9 = ts8 + ts7 |
| 17 | | | |
| 18 | | | |
| 19 | | | |
| 20 | | | |
| 21 | a(i:i+3) = ts9 | | |
| 22 | | | i = i + 4 |
| 23 | [branch.LABEL] | | |

FIG. 22

```
do i=2,10000
    a1(i) = a1(i-1) + b1(i)
    a2(i) = a2(i-1) + b2(i)
    a3(i) = a3(i-1) + b3(i)
enddo
```
251

⇩ (FOUR ITERATIONS)

| | COMPUTING UNIT 24 | COMPUTING UNIT 25 | COMPUTING UNIT 26 |
|---|---|---|---|
| | t10 = a1(1) | t20 = a2(1) | |
| | t30 = a3(1) | | |
| | [.LABEL] | | |
| 1 | t70 = b1(i) | t72 = b1(i+2) | |
| 2 | t80 = b2(i) | t82 = b2(i+2) | |
| 3 | t90 = b3(i) | t92 = b3(i+2) | |
| 4 | t71 = b1(i+1) | t73 = b1(i+3) | t40 = t10 + t70 |
| 5 | t81 = b2(i+1) | t83 = b2(i+3) | t50 = t20 + t80 |
| 6 | t91 = b3(i+1) | t93 = b3(i+3) | t60 = t30 + t90 |
| 7 | a1(i) = t40 | | t41 = t40 + t71 |
| 8 | a2(i) = t50 | | t51 = t50 + t81 |
| 9 | a3(i) = t60 | | t61 = t60 + t91 |
| 10 | a1(i+1) = t41 | | t42 = t41 + t72 |
| 11 | a2(i+1) = t51 | | t52 = t51 + t82 |
| 12 | a3(i+1) = t61 | | t62 = t61 + t92 |
| 13 | a1(i+2) = t42 | | t10 = t42 + t73 |
| 14 | a2(i+2) = t52 | | t20 = t52 + t83 |
| 15 | a3(i+2) = t62 | | t30 = t62 + t93 |
| 16 | a1(i+3) = t10 | | |
| 17 | a2(i+3) = t20 | | |
| 18 | a3(i+3) = t30 | | |
| 19 | | | i = i + 4 |
| 20 | [branch.LABEL] | | |

FIG. 23

```
do i=5,10000,4
    a1(i:i+3) = (a1(i-4:i-1) + (b1(i-3:i) + b1(i-2:i+1))) + (b1(i-1:i+2) +b1(i:i+3))
    a2(i:i+3) = (a2(i-4:i-1) + (b2(i-3:i) + b2(i-2:i+1))) + (b2(i-1:i+2) +b2(i:i+3))
    a3(i:i+3) = (a3(i-4:i-1) + (b3(i-3:i) + b3(i-2:i+1))) + (b3(i-1:i+2) +b3(i:i+3))
enddo
```
⇩ 252

|    | COMPUTING UNIT 24 | COMPUTING UNIT 25 | COMPUTING UNIT 26 | COMPUTING UNIT 27 |
|----|-------------------|-------------------|-------------------|-------------------|
|    | [.LABEL]          |                   |                   |                   |
| 1  | ts20 = b1(i-3:i)  | ts30 = b1(i-2:i+1)|                   |                   |
| 2  | ts21 = b2(i-3:i)  | ts31 = b2(i-2:i+1)|                   |                   |
| 3  | ts22 = b3(i-3:i)  | ts32 = b3(i-2:i+1)|                   |                   |
| 4  | ts40 = b1(i-1:i+2)| ts50 = b1(i:i+3)  |                   |                   |
| 5  | ts41 = b2(i-1:i+2)| ts51 = b2(i:i+3)  |                   |                   |
| 6  | ts42 = b3(i-1:i+2)| ts52 = b3(i:i+3)  |                   |                   |
| 7  | ts10 = a1(i-4:i-1)|                   | ts60 = ts20 + ts30| ts70 = ts40 + ts50|
| 8  | ts11 = a2(i-4:i-1)|                   | ts61 = ts21 + ts31| ts71 = ts41 + ts51|
| 9  | ts12 = a3(i-4:i-1)|                   | ts62 = ts22 + ts32| ts72 = ts42 + ts52|
| 10 |                   |                   | ts80 = ts10 + ts60|                   |
| 11 |                   |                   | ts81 = ts11 + ts61|                   |
| 12 |                   |                   | ts82 = ts12 + ts62|                   |
| 13 |                   |                   | ts90 = ts80 + ts70|                   |
| 14 |                   |                   | ts91 = ts81 + ts71|                   |
| 15 |                   |                   | ts92 = ts82 + ts72|                   |
| 16 | a1(i:i+3) = t90   |                   |                   |                   |
| 17 | a2(i:i+3) = t91   |                   |                   |                   |
| 18 | a3(i:i+3) = 92    |                   |                   |                   |
| 19 |                   |                   | i = i + 4         |                   |
| 20 | [branch.LABEL]    |                   |                   |                   |

```
subroutine foo(a,b,idx1,idx2)
real(8),dimension(1:10000) :: a,b
integer,dimension(1:10000) :: idx1,idx2
do i=1,10000
    a(idx1(i)) = a(idx2(i)) + b(i)
enddo
end subroutine
```
261

FIG. 25

COMPILER METHOD AND COMPILER APPARATUS FOR OPTIMIZING A CODE BY TRANSFORMING A CODE TO ANOTHER CODE INCLUDING A PARALLEL PROCESSING INSTRUCTION

CROSS-REFERENCE TO RELATED APPLICATION

This application is based upon and claims the benefit of priority of the prior Japanese Patent Application No. 2014-066929, filed on Mar. 27, 2014, the entire contents of which are incorporated herein by reference.

FIELD

The embodiments discussed herein relate to a compiler method and a compiler apparatus.

BACKGROUND

Some processors, such as CPU (Central Processing Unit), process a single instruction called "SIMD (Single Instruction Multiple Data) instruction" to execute same type of calculations in parallel for different data. Such processors for executing an SIMD instruction include registers called "SIMD register", which store a combination of different data that is to be processed in parallel. For example, if a processor receives an SIMD instruction ts1+ts2, when an SIMD register ts1 stores data A(1) and A(2), and an SIMD register ts2 stores data B(1) and B(2), then the processor executes two additions A(1)+B(1) and A(2)+B(2) in parallel.

In one method for generating a code including an SIMD instruction, an SIMD instruction is generated by extracting two or more instructions of a same calculation type that is executable in parallel from among a plurality of non-SIMD instructions, and combining the extracted instructions. For example, some compiler apparatuses, which transform a source code described in a high-level language to a machine-readable object code, combine two or more instructions to generate an SIMD instruction for the purpose of optimization. The number of combinable instructions (i.e., SIMD width) varies depending on the architecture of a processor.

According to one proposal, a compiler apparatus executes the following processing to transform a code to an SIMD instruction (i.e., SIMD transformation). This compiler apparatus estimates an execution time for each candidate of instruction combination. For example, when a first combination and a second combination are extracted as candidates of instruction combination, the compiler apparatus estimates an execution time for each of the first and second combinations. Then, the compiler apparatus selects a combination whose estimated execution time is shorter from the first combination and second combinations, in order to transform a code to an SIMD instruction. See, for example, Japanese Laid-open Patent Publication No. 2013-80407.

In the meantime, some codes executed by a compiler apparatus include a loop. A loop repeatedly executes a same arithmetic expression including a loop variable, changing the value of the loop variable (for example, incrementing the value of the loop variable by one).

In this execution, calculation of an m-th iteration of a loop and calculation of an n-th iteration of the same loop are, in some cases, executable in parallel by means of an SIMD instruction. For example, arrays A and B and a loop variable J are used to describe an arithmetic expression $A(J)=A(J)+B(J)$ in a loop. Here, calculation of Jth iteration $A(J)=A(J)+B(J)$ and calculation of J+1th iteration $A(J+1)=A(J+1)+B(J+1)$ are independent from each other. Accordingly, the compiler apparatus can transform a code to an SIMD instruction, so as to calculate $A(J)$ and $A(J+1)$ in parallel. In this case, the number of instructions executed in a loop is reduced in about half.

On the other hand, calculation of an m-th iteration of a loop and calculation of an n-th iteration of the same loop are, in some cases, inexecutable in parallel. For example, when an arithmetic expression $A(J)=A(J-1)+B(J)$ is described in a loop, calculation of J+1th iteration $A(J+1)=A(J)+B(J+1)$ refers to calculation result of Jth iteration $A(J)=A(J-1)+B(J)$. Accordingly, if $A(J)$ and $A(J+1)$ are calculated in parallel, its result might be different from the result obtained when $A(J)$ and $A(J+1)$ are calculated sequentially. Hence, in conventional compiler apparatuses, if calculation of an m-th loop iteration and calculation of an n-th loop iteration have dependency, an SIMD instruction is not used to optimize a process.

SUMMARY

According to one aspect, there is provided a non-transitory computer-readable storage medium storing a computer program that causes a computer to perform a procedure including: detecting a loop from a first code; developing a first arithmetic expression included in the loop and including a first variable that refers to a result of K iterations previous calculation, into a second arithmetic expression not including the first variable, using a second variable that refers to a result of K+1 iterations or more previous calculation, wherein K is an integer that is equal to or greater than 1; comparing a first execution time for executing the loop on the basis of the first arithmetic expression with a second execution time for executing the loop in which a calculation of Jth iteration of the loop and a calculation of J+Kth iteration of the loop are executed in parallel on the basis of the second arithmetic expression, wherein J is an integer that is equal to or greater than 1; and deciding based on a result of the comparing whether to transform the first code into a second code including a parallel processing instruction for executing the calculation of Jth iteration and the calculation of J+Kth iteration in parallel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates fourth exemplary code transformation by SIMD optimization;

FIG. 14 illustrates fifth exemplary code transformation by SIMD optimization;

FIG. 17 illustrates first exemplary calculation of the number of cycles of a loop;

FIG. 18 illustrates second exemplary calculation of the number of cycles of a loop;

FIG. 21 illustrates fourth exemplary calculation of the number of cycles of a loop;

FIG. 22 illustrates fifth exemplary calculation of the number of cycles of a loop;

FIG. 23 illustrates sixth exemplary calculation of the number of cycles of a loop;

FIG. 25 illustrates an exemplary code that is determined to be non-parallelizable.

DESCRIPTION OF EMBODIMENTS

Figure 1:
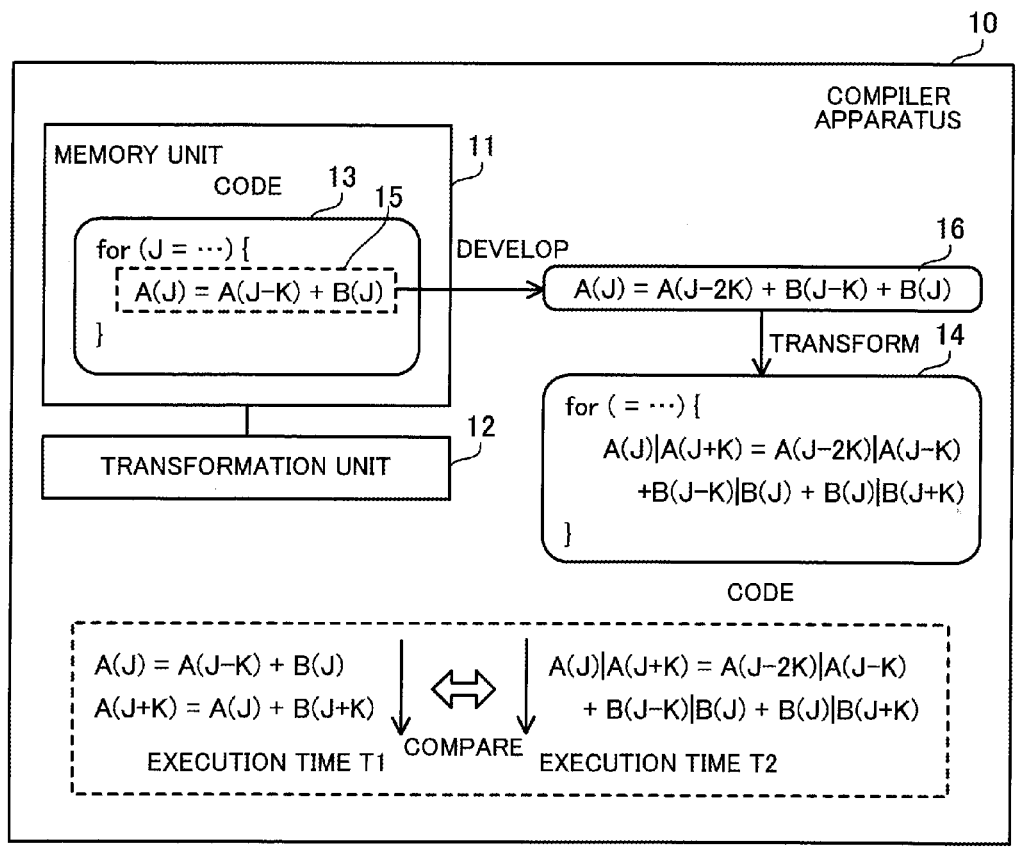
FIG. 1 illustrates an example of a compiler apparatus of a first embodiment.

Several embodiments will be described below with reference to the accompanying drawings, wherein like reference numerals refer to like elements throughout.

First Embodiment

FIG. 1 illustrates an example of a compiler apparatus of the first embodiment. The compiler apparatus 10 of the first embodiment is operable to optimize a code by transforming a code 13 to another code 14 including a parallel processing instruction. The parallel processing instruction is a single instruction, such as an SIMD instruction, that causes a processor to execute calculations of different data in parallel. The codes 13 and 14 describe what a processor executes by an instruction. The code 13 may be a source code described in a high-level language or an intermediate code transformed from a source code. The code 14 may be an optimized intermediate code, an assembly code, or a machine-readable object code. Also, the compiler apparatus 10 may be a terminal device operated by a user or a server device accessed from such a terminal device. The compiler apparatus 10 may be implemented by a computer or an information processing apparatus.

The compiler apparatus 10 includes a memory unit 11 and a transformation unit 12. The memory unit 11 stores the code 13. The memory unit 11 may be a volatile memory device, such as a RAM (Random Access Memory), or a non-volatile memory device, such as an HDD (Hard Disk Drive). The transformation unit 12 is operable to transform the code 13 stored in the memory unit 11 to the code 14. The transformation unit 12 may include a processor, such as a CPU and a DSP (Digital Signal Processor), or a specific purpose electronic circuit, such as an ASIC (Application Specific Integrated Circuit) and an FPGA (Field Programmable Gate Array). The processor executes programs stored in the memory unit 11 or other memory devices, for example. Note that an aggregation of a plurality of processors (multiprocessor) may be called "processor".

The transformation unit 12 detects a loop including an arithmetic expression 15 that satisfies a certain condition, from the code 13 stored in the memory unit 11. The arithmetic expression 15 includes a variable (first variable) that refers to a result of K iterations previous calculation (K is an integer that is equal to or greater than 1). For example, an arithmetic expression $A(J)=A(J-K)+B(J)$ includes a variable $A(J-K)$ whose value is set in K iterations previous calculation. The variable $A(J-K)$ corresponds to the "first variable". If K=1, the above arithmetic expression is $A(J)=A(J-1)+B(J)$, which refers to the result of one iteration previous calculation.

When a loop includes such an arithmetic expression 15, calculation of J+Kth loop iteration (J is an integer that is equal to or greater than 1) is dependent on calculation of Jth iteration. Thus, unmodified calculation of J+Kth iteration is not to be executed in parallel with calculation of Jth iteration. Hence, the transformation unit 12 transforms the arithmetic expression 15 so as not to include the "first variable", to make calculation of Jth iteration and calculation of J+Kth iteration executable in parallel. Specifically, the transformation unit 12 develops the arithmetic expression 15 to another arithmetic expression 16, using a variable (second variable) that refers to the result of K+1 iterations or more previous calculation.

For example, the transformation unit 12 develops the variable $A(J-K)$ included in the arithmetic expression $A(J)=A(J-K)+B(J)$ into an arithmetic expression $A(J)=A(J-2K)+B(J-K)+B(J)$, using the arithmetic expression $A(J)=A(J-K)+B(J)$ itself. The variable $A(J-2K)$ included in the arithmetic expression after development refers to the result of 2K iterations previous calculation. The variable $A(J-2K)$ corresponds to the "second variable". The reference to the result of 2K iterations previous calculation cuts off dependency on K iterations previous calculation. If K=1, the result of two iterations previous calculation is utilized to cut off dependency on one iteration previous calculation. The range of parallelly executable calculation is expanded by repeatedly developing past variables having dependency as described above. For example, developing variables three times cuts off dependency on one to three iterations previous calculations, and makes calculations of four iterations executable in parallel.

However, calculation amount and memory access traffic for the developed arithmetic expression 16 are often larger than calculation amount and memory access traffic for the arithmetic expression 15 before development. Hence, even if at least calculation of Jth iteration and calculation of J+Kth iteration are parallelized on the basis of the arithmetic expression 16, the code 14 is not necessarily more efficient than the non-parallelized code before development. Whether or not the arithmetic expression 16 makes the code 14 more efficient is dependent on architecture of a processor that executes a loop, for example a degree of parallelization and the number of cycles for executing a parallel processing instruction. Also, whether or not the code 14 becomes more efficient is dependent on the arithmetic expression 15 itself before development.

Thus, the transformation unit 12 compares an execution time T1 for executing a loop on the basis of the arithmetic expression 15, and an execution time T2 for executing at least calculation of Jth iteration and calculation of J+Kth iteration in parallel on the basis of the arithmetic expression 16. The transformation unit 12 may provisionally schedule instructions with reference to processor information indicating architecture of a processor, to estimate the execution times T1 and T2. The unit of the execution times T1 and T2 may be a cycle number or a clock number.

For example, the transformation unit 12 calculates the execution time T1 for executing calculations $A(J)=A(J-K)+B(J)$ and $A(J+K)=A(J)+B(J+K)$ without utilizing a parallel processing instruction, such as an SIMD instruction. Also, the transformation unit 12 calculates the execution time T2 for executing calculations $A(J)=A(J-2K)+B(J-K)+B(J)$ and $A(J+K)=A(J-K)+B(J)+B(J+K)$, utilizing a parallel processing instruction.

Then, the transformation unit 12 decides whether to transform the code 13 to the code 14 including a parallel processing instruction, such as an SIMD instruction, on the basis of a comparison result. For example, when the execution time T2 is smaller than the execution time T1 (in other words, when the execution time becomes shorter), the transformation unit 12 decides to transform the code 13 to the code 14. Also, for example, when the execution time T2 is equal to or longer than the execution time T1 (in other words, when the execution time does not become shorter), the transformation unit 12 decides not to transform the code 13 to the code 14.

According to the compiler apparatus 10 of the first embodiment, the arithmetic expression 15 including a variable that refers to a result of K iterations previous calculation is developed into the arithmetic expression 16 not including the same variable. Then, the execution time T1 for executing a loop on the basis of the arithmetic expression 15 and the execution time T2 for parallelizing and executing a loop on the basis of the arithmetic expression 16 are compared to decide whether or not to transform the code 13 to the code 14 including a parallel processing instruction on the basis of the result of comparison. Thereby, increase of calculation amount and memory access traffic by the development of arithmetic expression and reduction of the number of instructions by utilizing parallel processing instruction are totally assessed to shorten the execution time of a loop.

Second Embodiment

The compiler apparatus 100 of the second embodiment compiles a source code described in a high-level language to generate a machine-readable object code. The compiler apparatus 100 may be a terminal device operated by a user or a server device accessed from a terminal device. The compiler apparatus 100 is, for example, implemented by a computer. In that case, the compiler apparatus 100 executes a software compiler.

Figure 2:
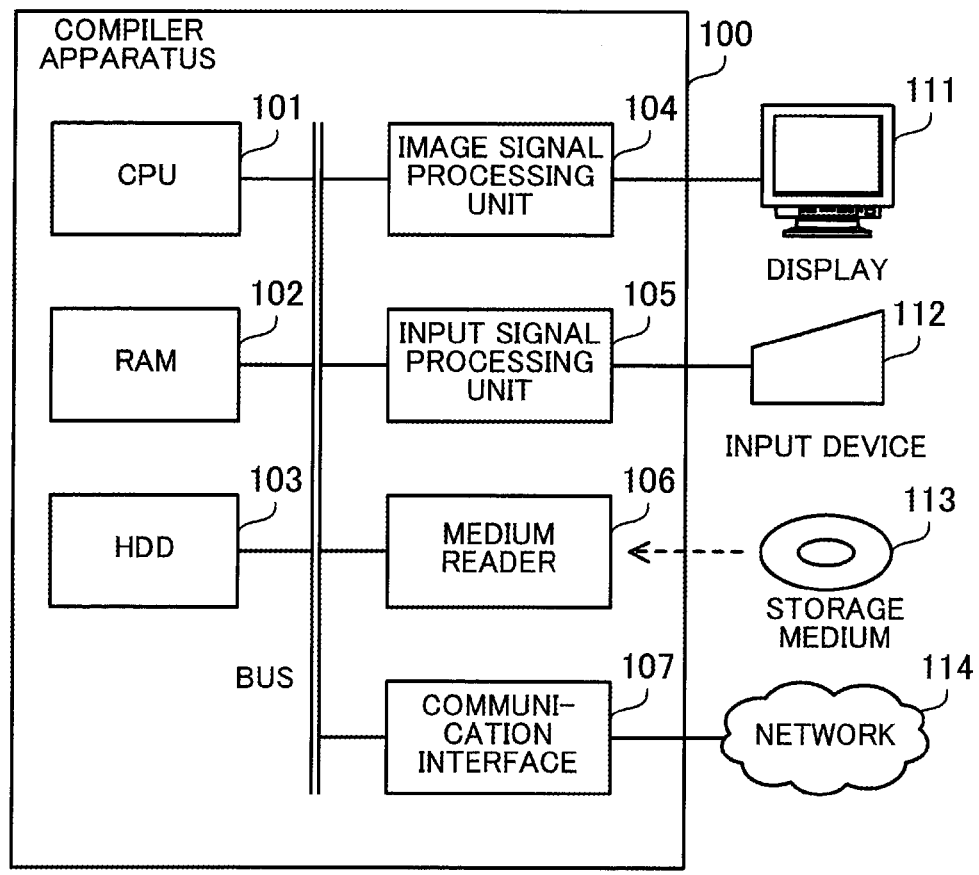
FIG. 2 illustrates exemplary hardware of a compiler apparatus of a second embodiment.

FIG. 2 illustrates an exemplary hardware of the compiler apparatus of the second embodiment. The compiler apparatus 100 includes a CPU 101, a RAM 102, an HDD 103, an image signal processing unit 104, an input signal processing unit 105, a medium reader 106, and a communication interface 107. These units are connected to a bus. The CPU 101 is an example of the transformation unit 12 of the first embodiment, and the RAM 102 is an example of the memory unit 11 of the first embodiment.

The CPU 101 is a processor including an arithmetic circuit that executes instructions of a program. The CPU 101 loads at least a part of programs and data stored in the HDD 103 into the RAM 102 in order to execute programs. Note that the CPU 101 may include a plurality of processor cores. The compiler apparatus 100 may include a plurality of processors. Such processors or processor cores may execute the process described below in parallel. Also, an aggregation of processors (multiprocessor) may be called "processor".

The RAM 102 is a volatile semiconductor memory that temporarily stores programs executed by the CPU 101 and data that the CPU 101 uses in calculation. Note that the compiler apparatus 100 may include a memory of a type other than a RAM. Also, the compiler apparatus 100 may include a plurality of memories.

The HDD 103 is a non-volatile memory device that stores software programs, such as an OS (Operating System), a middleware, and an application software, as well as data. Programs stored in the HDD 103 include a compile program. Note that the compiler apparatus 100 may include memory devices of other type, such as a flash memory and an SSD (Solid State Drive). Also, the compiler apparatus 100 may include a plurality of non-volatile memory devices.

The image signal processing unit 104 outputs an image to a display 111 connected to the compiler apparatus 100, in accordance with instruction from the CPU 101. The display 111 may be a CRT (Cathode Ray Tube) display, a liquid crystal display (LCD), a plasma display panel (PDP), and an organic electro-luminescence (OEL) display, for example.

The input signal processing unit 105 acquires an input signal from an input device 112 connected to the compiler apparatus 100, and outputs the input signal to the CPU 101. The input device 112 may be a pointing device, such as a mouse, a touch panel, a touch pad, and a trackball, as well as a keyboard, a remote controller, and a button switch, for example. Also, different types of input devices may be connected to the compiler apparatus 100.

The medium reader 106 is a reader device that reads programs and data stored in a storage medium 113. The storage medium 113 may be a magnetic disk such as a flexible disk (FD) and an HDD, an optical disc such as a CD (Compact Disc) and a DVD (Digital Versatile Disc), a magneto-optical disk (MO), and a semiconductor memory, for example. The medium reader 106 stores programs and data read from the storage medium 113 in the RAM 102 or the HDD 103, for example.

The communication interface 107 is an interface that is connected to a network 114 to communicate with other computers via the network 114. The communication interface 107 may be a wired communication interface connected to a communication device, such as a switch, by a cable. Alternatively, the communication interface 107 may be a wireless communication interface connected to a base station by a wireless link.

Note that the compiler apparatus 100 may be configured without the medium reader 106. Also, the compiler apparatus 100 may be configured without the image signal processing unit 104 and the input signal processing unit 105, when controlled from a terminal device operated by a user. Also, the display 111 and the input device 112 may be formed integrally with a housing of the compiler apparatus 100.

Figure 3:
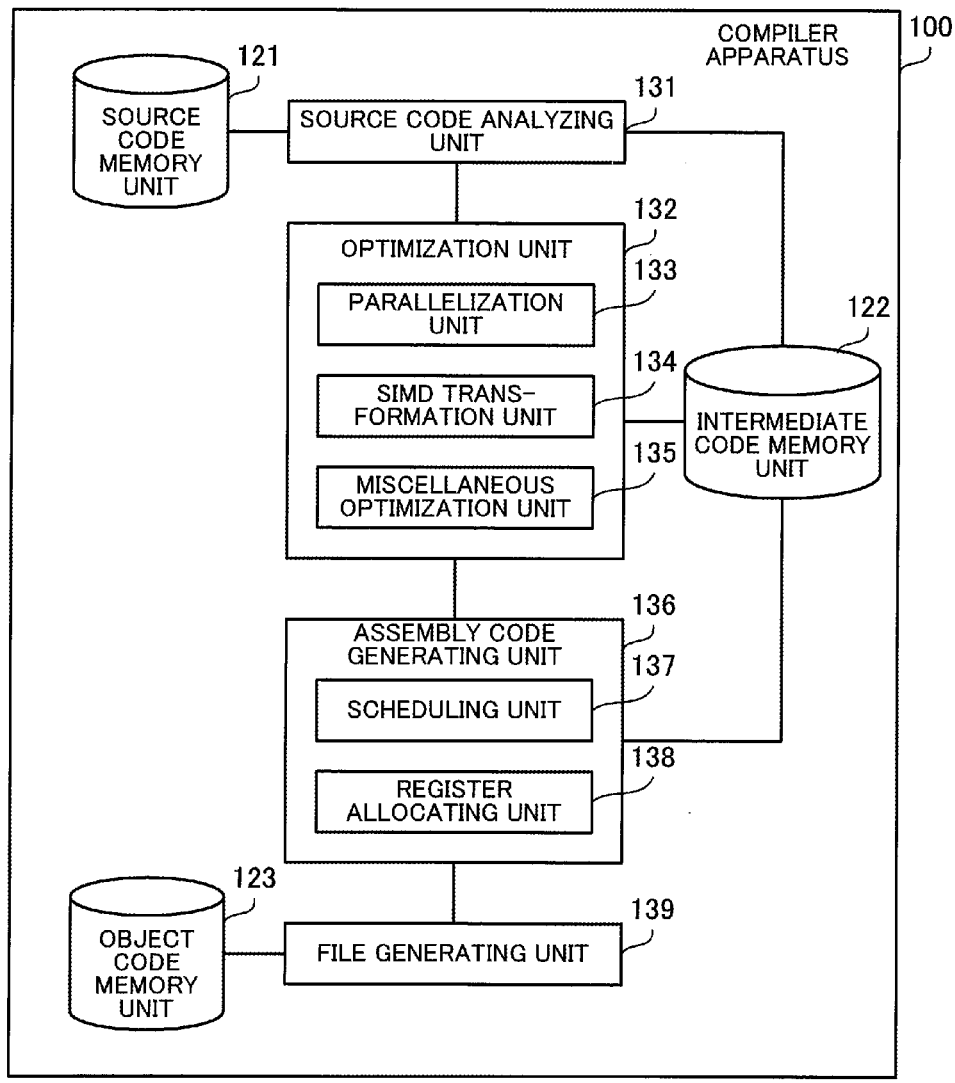
FIG. 3 illustrates an exemplary function of the compiler apparatus of the second embodiment.

FIG. 3 illustrates an exemplary function of the compiler apparatus of the second embodiment. The compiler apparatus 100 includes a source code memory unit 121, an intermediate code memory unit 122, an object code memory unit 123, a source code analyzing unit 131, an optimization unit 132, an assembly code generating unit 136, and a file generating unit 139. The source code memory unit 121, the intermediate code memory unit 122, and the object code memory unit 123 are memory regions in the RAM 102 or the HDD 103, for example. The source code analyzing unit 131, the optimization unit 132, the assembly code generating unit 136, and the file generating unit 139 are modules of programs executed by the CPU 101, for example.

The source code memory unit 121 stores a source code that is created by a user and described in a high-level language. The high-level language is, for example, a procedural language, such as FORTRAN and C. The source code may be generated in the compiler apparatus 100, or may be generated in another device and transmitted to the compiler apparatus 100.

The intermediate code memory unit 122 stores an intermediate code that is transformed from a source code and has not yet transformed into an object code. The intermediate code is a code used internally in the course of compilation. The compiler apparatus 100 may decide how the intermediate code is described, in a predetermined manner. As described later, the intermediate code is optimized.

The object code memory unit 123 stores an object code that is generated from a source code via an intermediate code and described in a machine language. In the machine language, instructions and operands are described by bit strings (numerical value). The object code is generated, targeting a certain type of CPU. The CPU executing the object code may be the CPU 101 included in the compiler apparatus 100, or a CPU included in another device.

The compiler apparatus 100 may generate an object code, targeting a CPU architecture that a user selects from among a plurality of CPU architectures. In that case, the compiler apparatus 100 stores CPU information that indicates applicable instructions, numbers of cycles for executing respective instructions, and usable registers, with respect to each CPU architecture, for example. With reference to CPU information of CPU architecture selected by a user, the compiler apparatus 100 generates an object code executable by the CPU architecture.

The source code analyzing unit 131 receives a compile command including a source file name and other data. In response, the source code analyzing unit 131 reads out a source code included in the identified source file from the source code memory unit 121, and executes a front-end process, such as lexical analysis, syntax analysis, and semantic analysis. Then, the source code analyzing unit 131 generates an intermediate code corresponding to the source code, and stores the intermediate code in the intermediate code memory unit 122. Also, when the compile command includes a compile option, the source code analyzing unit 131 notifies the optimization unit 132 of the compile option in some cases. The compile option can include an option that allows the execution order of operators to change, as described later.

The optimization unit 132 reads out intermediate codes stored in the intermediate code memory unit 122, and searches for an intermediate code whose process can be made more efficient with no change in its processing result. The optimization unit 132 rewrites the searched intermediate code in the intermediate code memory unit 122, to optimize the object code generated in the compiler apparatus 100. The optimization unit 132 includes a parallelization unit 133, an SIMD transformation unit 134, and a miscellaneous optimization unit 135.

The parallelization unit 133 confirms whether the target CPU includes a plurality of hardware units, such as hardware threads and CPU cores, which are operable to execute instructions in parallel. When the target CPU includes a plurality of hardware units, the parallelization unit 133 analyzes dependency between instructions included in an intermediate code, and determines a combination of instructions that are executable in parallel. Optimization by the parallelization unit 133 may be executed after optimization by the SIMD transformation unit 134. The instructions executed in parallel may be scalar instructions that process one data unit for each operand, or SIMD instructions that process two or more data units for each operand.

The SIMD transformation unit 134 confirms whether the target CPU is operable to execute an SIMD instruction. When the target CPU is operable to execute an SIMD instruction, the SIMD transformation unit 134 decides a combination of scalar instructions that are to be transformed into an SIMD instruction, and rewrites an intermediate code stored in the intermediate code memory unit 122. An upper limit of the number of scalar instructions that are transformed into one SIMD instruction (i.e., SIMD width) differs depending on architecture of the target CPU. The SIMD transformation unit 134 selects scalar instructions that are as many as or fewer than the SIMD width, and transforms the selected scalar instructions to an SIMD instruction.

Here, in some cases, the SIMD transformation unit 134 changes a calculation procedure indicated by a source code with no change in its processing result, in order to generate an SIMD instruction having a high execution efficiency. As described later, the second embodiment features the SIMD transformation unit 134 that transforms calculations in a loop to an SIMD instruction. For example, when dependency is not formed between calculation of i-th iteration in a loop and calculation of i+1th iteration of the same loop, these two calculations are transformed into an SIMD instruction, reducing the total number of loop iterations.

The miscellaneous optimization unit 135 optimizes an intermediate code by various methods that do not depend on the target CPU. Optimizing an intermediate code by various methods may include keep storing a calculation result that is referred to in the later process in a register, so as to reduce memory access. Also, optimizing an intermediate code by various methods may include, for example, changing a control structure so as to reduce branch instructions, and deleting unnecessary calculations and variables that do not affect subsequent calculation (for example, calculation for estimating a value that is not referred to, and a variable for storing such a value).

After optimization by the optimization unit 132, the assembly code generating unit 136 reads out an intermediate code stored in the intermediate code memory unit 122, and transforms the optimized intermediate code to an assembly code described in an assembly language. The assembly code generating unit 136 includes a scheduling unit 137 and a register allocating unit 138.

The scheduling unit 137 changes the order of instructions with no change in its processing result, so as to improve execution efficiency of the instructions. For example, the scheduling unit 137 decides the order of instructions that are put into a pipeline, in such a manner to reduce pipeline hazards. Also, when the target CPU includes a plurality of hardware units, the scheduling unit 137 may direct instructions in advance to the hardware units.

The register allocating unit 138 allocates registers in the target CPU to variables included in an intermediate code. The register allocating unit 138 allocates SIMD registers for storing two or more data units to variables that are operands of an SIMD instruction. The register allocating unit 138 may allocate registers in such a manner to minimize registers to use.

The file generating unit 139 generates an object file in the object code memory unit 123. The file generating unit 139 transforms an assembly code generated by the assembly code generating unit 136 to a machine-readable object code, and writes the machine-readable object code in the generated object file. This ends compilation of a source code.

Figure 4:
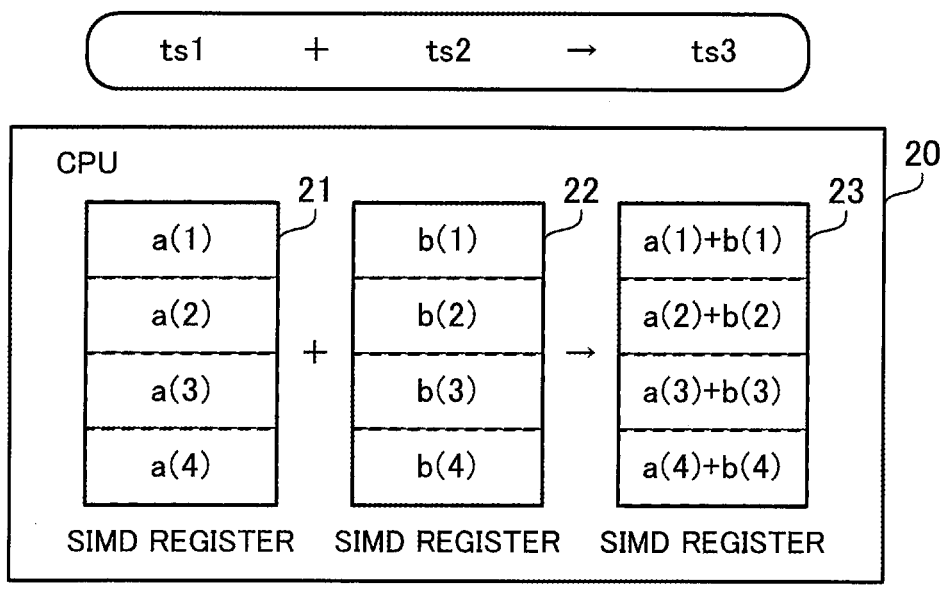
FIG. 4 illustrates an example of an SIMD instruction and SIMD registers.

FIG. 4 illustrates an example of an SIMD instruction and SIMD registers. In the following, a CPU 20 executes an object code generated by the compiler apparatus 100. The CPU 20 may be same as or different from the CPU 101 in the compiler apparatus 100. The CPU 20 includes SIMD registers 21 to 23 (ts1, ts2, and ts3). When the CPU 20 is operable to execute an SIMD instruction having an SIMD width of four, each of the SIMD registers 21 to 23 is operable to store four data units.

For example, a source code or an intermediate code defines four calculations a(1)+b(1), a(2)+b(2), a(3)+b(3), and a(4)+b(4), using array variables a and b having a length equal to or greater than four. When the SIMD transformation unit 134 transforms these four calculations to an SIMD instruction, the values of variable a(1), a(2), a(3), and a(4) are loaded in this order in the SIMD register 21, for example. Also, the values of variable b(1), b(2), b(3), and b(4) are loaded in this order in the SIMD register 22.

Then, when an SIMD instruction ts1+ts2=ts3 is input, the CPU 20 combines data units stored in locations corresponding to each other in the SIMD registers 21 and 22, in order to execute the following four calculations in parallel. The value of a(1) of the SIMD register 21 and the value of b(1) of the SIMD register 22 are added and stored in the first location of the SIMD register 23. The value of a(2) of the SIMD register 21 and the value of b(2) of the SIMD register 22 are added and stored in the second location of the SIMD register 23. The value of a(3) of the SIMD register 21 and the value of b(3) of the SIMD register 22 are added and stored in the third location of the SIMD register 23. The value of a(4) of the SIMD register 21 and the value of b(4) of the SIMD register 22 are added and stored in the fourth location of the SIMD register 23.

Next, following description will explain an example of how the SIMD transformation unit 134 transforms calculation process of a loop into an SIMD instruction. In the following, the SIMD width of a target CPU is four, and four iterations of calculations (calculations of i-th iteration to i+3th iteration) in a loop are parallelized, using an SIMD instruction. Thereby, the number of loop iterations is reduced to approximately one fourth of its original value, and the number of executed instructions is reduced. To facilitate understanding, following exemplary codes are described in FORTRAN, which is one of high-level languages. The SIMD transformation unit 134 practically executes SIMD optimization to intermediate codes.

Figure 5:
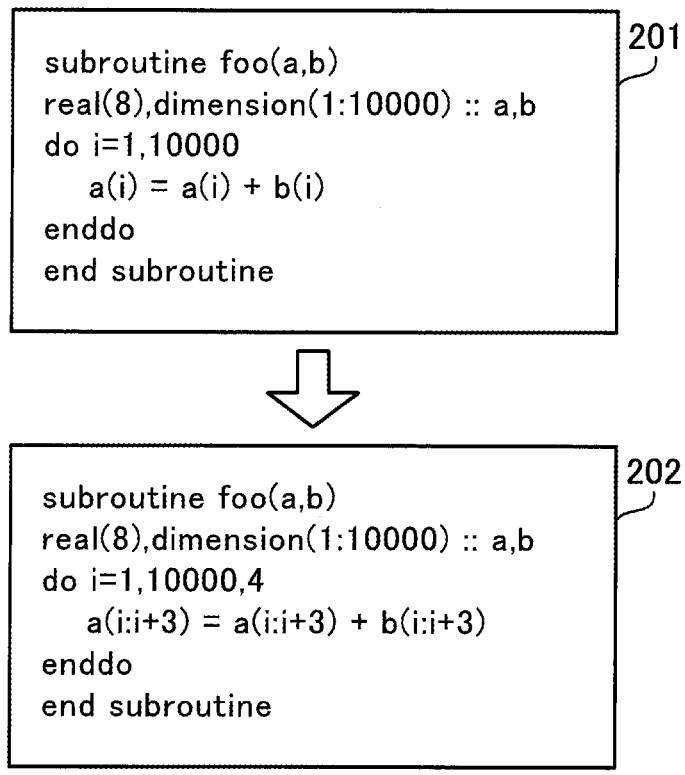
FIG. 5 illustrates first exemplary code transformation by SIMD optimization.

FIG. 5 illustrates first exemplary code transformation by SIMD optimization. A code 201 defines double-precision floating-point array variables a and b each having a length of 10000, a loop variable i, a loop that increments the loop variable i from 1 to 10000 by 1, and an arithmetic expression a(i)=a(i)+b(i) in the loop. An initial value of each element of the array variables a and b is set by a code that calls subroutine foo. Here, the SIMD transformation unit 134 transforms the code 201 into a code 202 below, for example.

The code 202 defines a loop that increments the loop variable i from 1 to 10000 by 4, and an arithmetic expression a(i:i+3)=a(i:i+3)+b(i:i+3) in the loop. A (i:i+3) is a sub-array having a length of four from i to i+3 in the array variable a. Likewise, b(i:i+3) is a sub-array having a length of four from i to i+3 in the array variable b. Loading, adding, and storing programmed in the code 202 are SIMD instructions (SIMD-LOAD, SIMD-ADD, SIMD-STORE etc.). Thus, the number of loop iterations reduces from 10000 to 2500. In each of 2500 iterations, calculation of four iterations of the original loop are executed in parallel.

Figure 6:
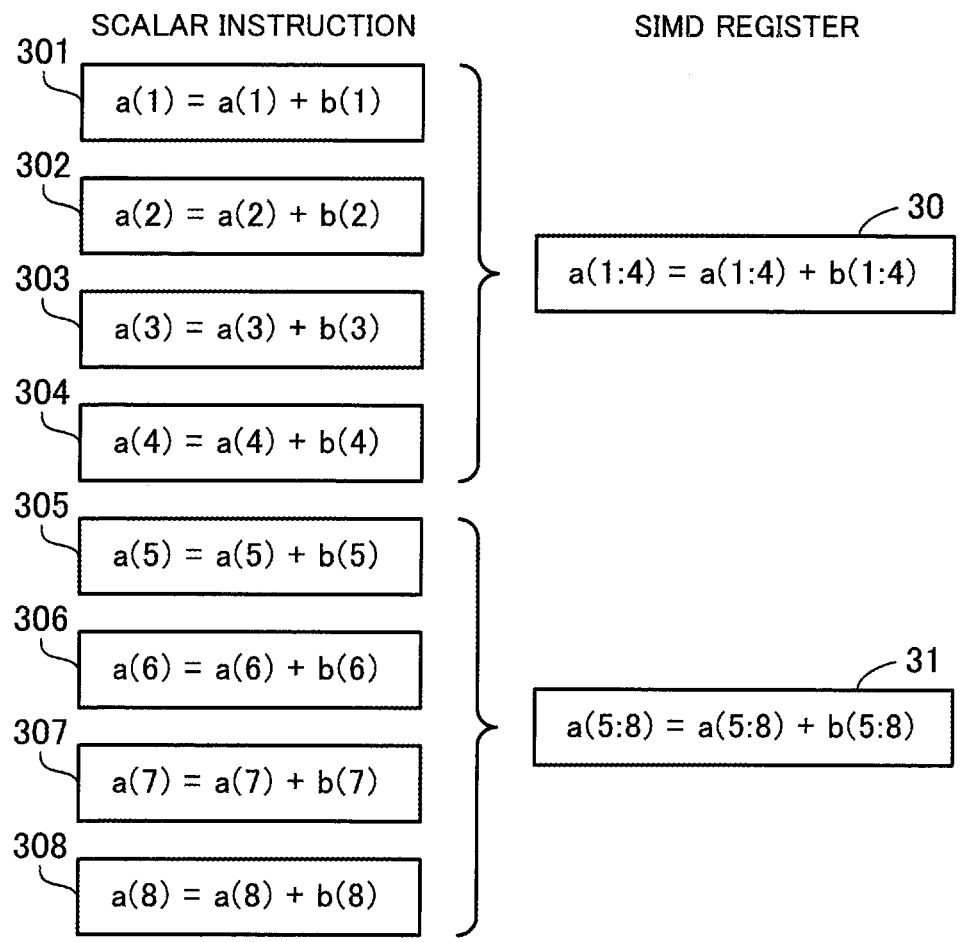
FIG. 6 illustrates first exemplary correspondence of calculations before and after SIMD transformation.

FIG. 6 illustrates first exemplary correspondence of calculations before and after SIMD transformation. When the loop of the code 201 is executed, a calculation 301 corresponding to i=1, that is, a(1)=a(1)+b(1) is executed first. Then, a calculation 302 corresponding to i=2, that is, a(2)=a(2)+b(2) is executed. Thereafter, a calculation 303 corresponding to i=3, a calculation 304 corresponding to i=4, a calculation 305 corresponding to i=5, a calculation 306 corresponding to i=6, a calculation 307 corresponding to i=7, and a calculation 308 corresponding to i=8 are executed sequentially.

In contrast, when the loop of the code 202 is executed, a calculation 30 corresponding to i=1, that is, a(1:4)=a(1:4)+b(1:4) is executed first. The calculation 30 corresponds to calculations 301 to 304 of the code 201. The calculation for setting a(i) is the only calculation that refers to a(i), and thus the calculations 301 to 304 are not dependent on each other, so as to be parallelized using an SIMD instruction. Then, a calculation 31 corresponding to i=5, that is, a(5:8)=a(5:8)+b(5:8) is executed. The calculation 31 corresponds to calculations 305 to 308 of the code 201. The calculations 305 to 308 are not dependent on each other, so as to be parallelized using an SIMD instruction.

Figure 7:
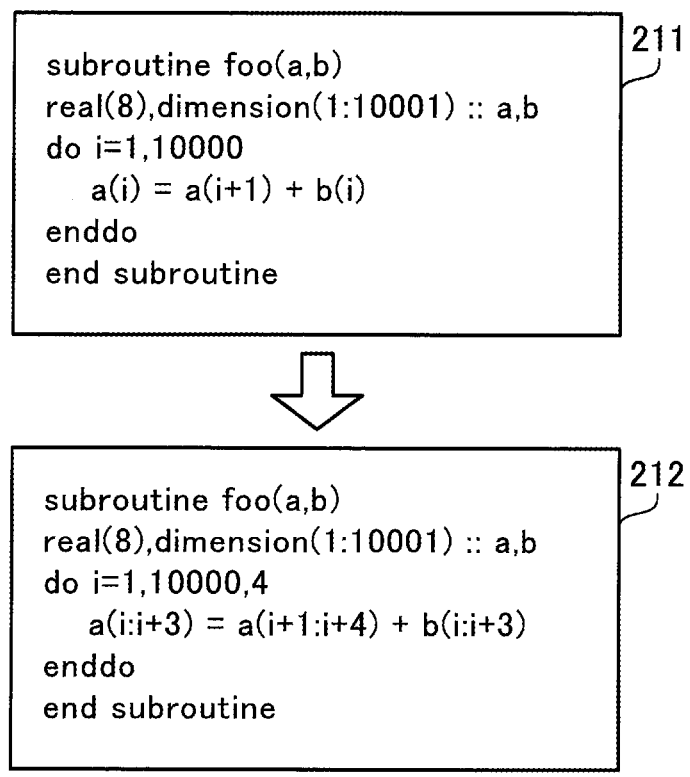
FIG. 7 illustrates second exemplary code transformation by SIMD optimization.

FIG. 7 illustrates second exemplary code transformation by SIMD optimization. A code 211 defines a loop that increments a loop variable i from 1 to 10000 by 1, and an arithmetic expression a(i)=a(i+1)+b(i) in the loop. Here, the SIMD transformation unit 134 transforms the code 211 to a code 212, for example. The code 212 defines a loop that increments a loop variable i from 1 to 10000 by 4, and an arithmetic expression a(i:i+3)=a(i+1:i+4)+b(i:i+3) in the loop.

Figure 8:
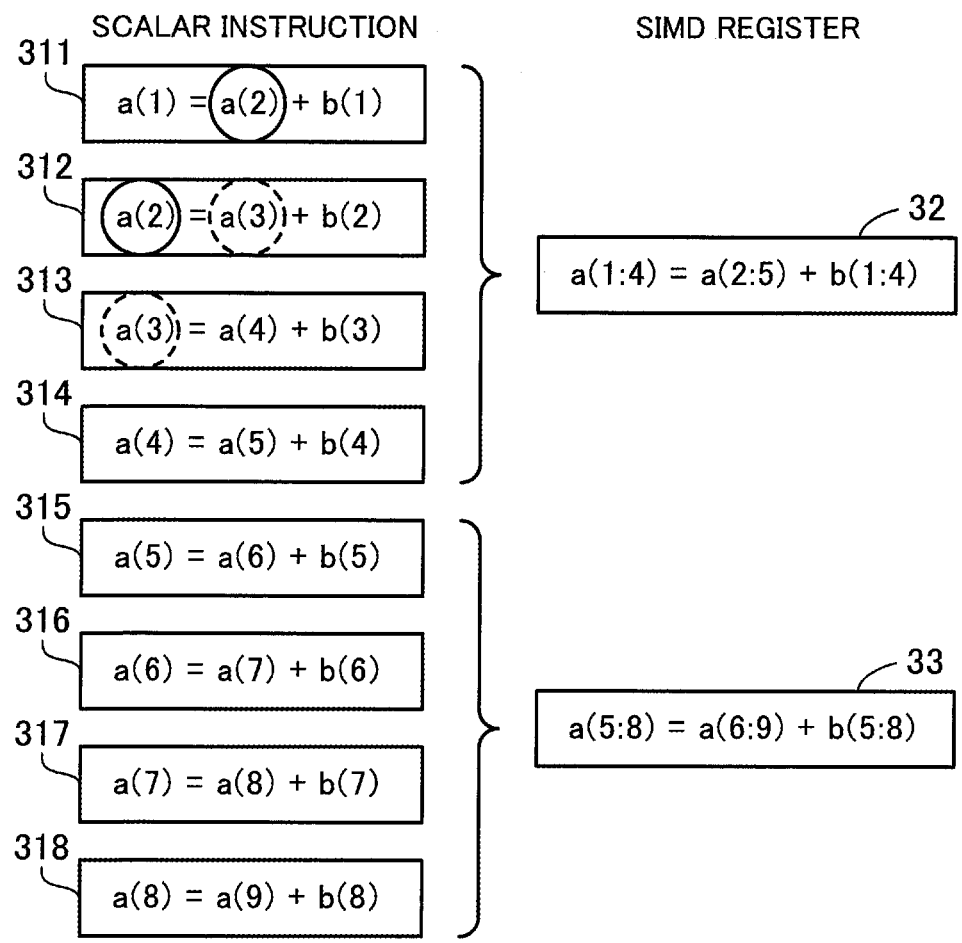
FIG. 8 illustrates second exemplary correspondence of calculations before and after SIMD transformation.

FIG. 8 illustrates second exemplary correspondence of calculations before and after SIMD transformation. When the loop of the code 211 is executed, a calculation 311 corresponding to i=1, that is, a(1)=a(2)+b(1) is executed first. Then, a calculation 312 corresponding to i=2, that is, a(2)=a(3)+b(2) is executed. Thereafter, a calculation 313 corresponding to i=3, a calculation 314 corresponding to i=4, a calculation 315 corresponding to i=5, a calculation 316 corresponding to i=6, a calculation 317 corresponding to i=7, and a calculation 318 corresponding to i=8 are executed. In contrast, when the loop of the code 212 is executed, a calculation 32 corresponding to i=1, that is, a(1:4)=a(2:5)+b(1:4) is executed first. Then, a calculation 33 corresponding to i=5, that is, a(5:8)=a(6:9)+b(5:8) is executed.

Here, the calculation for setting a(i) refers to a(i+1), and therefore there is dependency between the calculations 311 to 314. For example, the calculation 311 refers to a(2), and the calculation 312 updates a(2). The calculation 312 refers to a(3), and the calculation 313 updates a(3). However, according to the dependency between the calculations 311 to 314, referring and setting are executed in this order. That is, a(i) is first referred to and thereafter updated. Even if the calculations 311 to 314 are parallelized, this order is not broken. For example, values of a(2) and a(3) are loaded in an SIMD register from a memory (referring) and added, and thereafter the values of a(2) and a(3) are stored in the memory (setting).

Thereby, the calculations 311 to 314 are parallelized and transformed into the calculation 32, despite their dependency. In the same way, the calculations 315 to 318 are parallelized and transformed into the calculation 33, despite their dependency, since the order of referring and setting is not broken.

Figure 9:
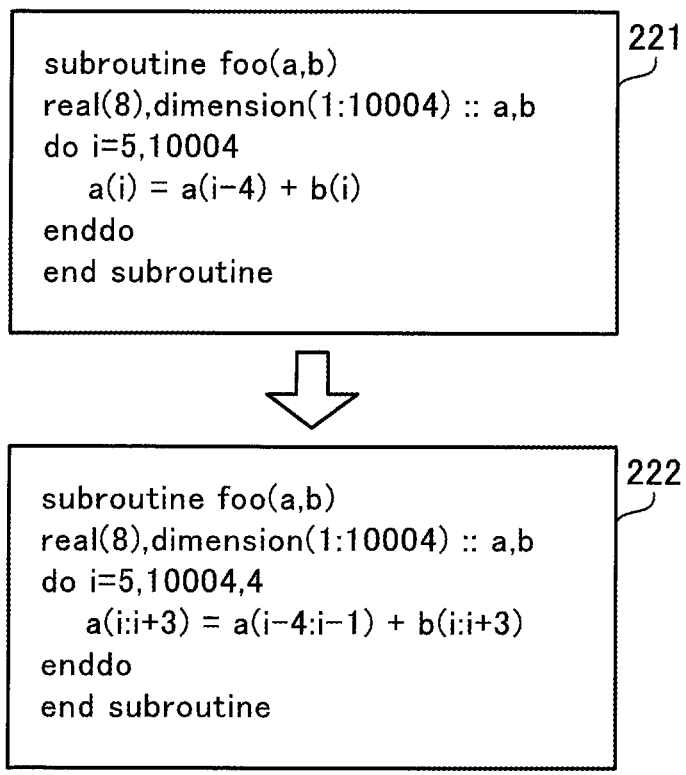
FIG. 9 illustrates third exemplary code transformation by SIMD optimization.

FIG. 9 illustrates third exemplary code transformation by SIMD optimization. A code 221 defines double-precision floating-point array variables a and b having a length of 10004, a loop that increments a loop variable i from 5 to 10004 by 1, and an arithmetic expression a(i)=a(i−4)+b(i) in the loop. Here, the SIMD transformation unit 134 transforms the code 221 to a code 222, for example. The code 222 defines a loop that increments a loop variable i from 5 to 10004 by 4, and an arithmetic expression a(i:i+3)=a(i−4:i−1)+b(i:i+3) in the loop.

Figure 10:
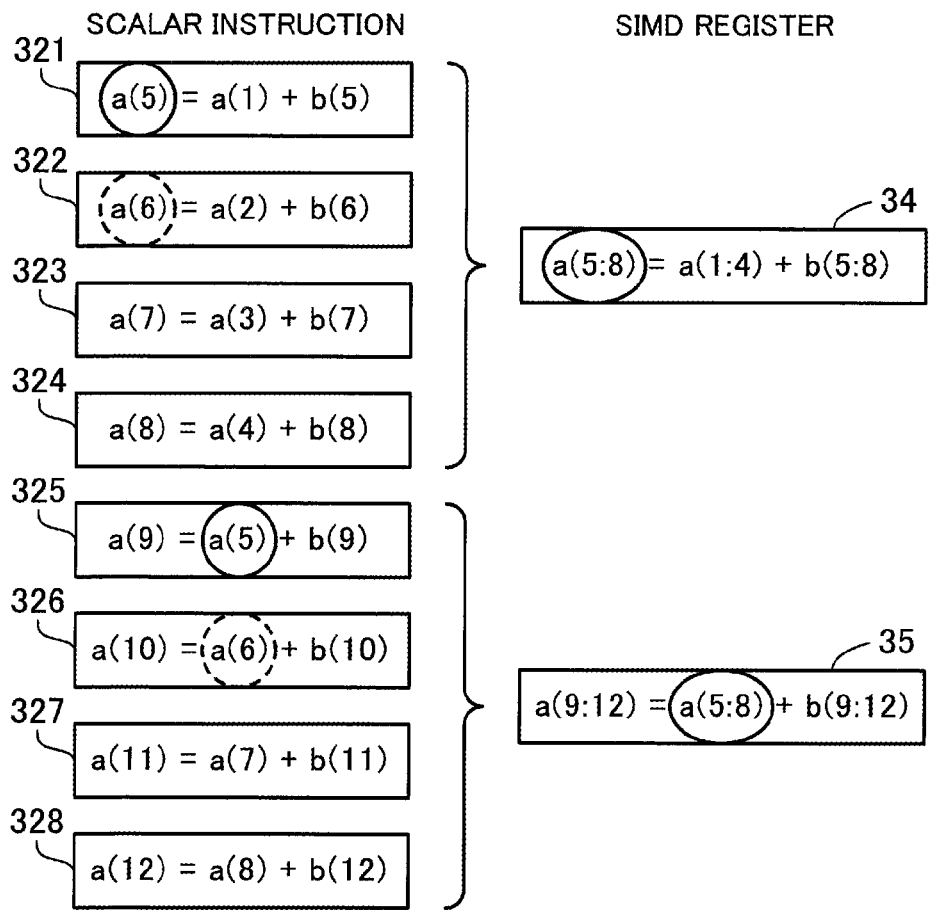
FIG. 10 illustrates third exemplary correspondence of calculations before and after SIMD transformation.

FIG. 10 illustrates third exemplary correspondence of calculations before and after SIMD transformation. When the loop of the code 221 is executed, a calculation 321 corresponding to i=5, that is, a(5)=a(1)+b(5) is executed first. Then, a calculation 322 corresponding to i=6, that is, a(6)=a(2)+b(6) is executed. Thereafter, a calculation 323 corresponding to i=7, a calculation 324 corresponding to i=8, a calculation 325 corresponding to i=9, a calculation 326 corresponding to i=10, a calculation 327 corresponding to i=11, and a calculation 328 corresponding to i=12 are executed. In contrast, when the loop of the code 222 is executed, a calculation 34 corresponding to i=5, that is, a(5:8)=a(1:4)+b(5:8) is executed first. Then, a calculation 35 corresponding to i=9, that is, a(9:12)=a(5:8)+b(9:12) is executed.

Here, there is dependency between the calculations 321 to 328, in which a(i) is set and thereafter referred to. For example, a(5) is set in the calculation 321, and referred to in the calculation 325. a(6) is set in the calculation 322, and referred to in the calculation 326. If a calculation that sets a(i) and a calculation that refers to a(i) are parallelized, the order of setting and referring is broken, resulting in incorrect transformation whose calculation method is different from the original arithmetic expression.

However, in the calculations 321 to 328, calculation that sets a(i) and calculation that refers to a(i) are an SIMD width or more away from each other on timeline. For example, the calculation 321 that sets a(5) and the calculation 325 that refers to a(5) are four loop iterations away from each other. The calculation 322 that sets a(6) and the calculation 326 that refers to a(6) are four loop iterations away from each other. Hence, even when an SIMD instruction is used, calculation that sets a(i) and calculation that refers to a(i) are not parallelized, and thus the order of setting and referring is not broken substantially. For example, calculations that sets a(5) and a(6) correspond to the calculation 34 of the code 222, and calculations that refers to a(5) and a(6) correspond to the calculation 35 of the code 222. As far as the calculation 35 is executed after the calculation 34, the order of setting and referring of a(5) and a(6) is not broken. Thus, SIMD transformation is executable.

FIG. 11 illustrates fourth exemplary code transformation by SIMD optimization. A code 231 defines the double-precision floating-point array variables a and b having a length of 10000, a loop that increments a loop variable i from 2 to 10000 by 1, and an arithmetic expression a(i)=a(i−1)+b(i) in the loop. Here, the SIMD transformation unit 134 transforms the code 231 into a code 234 via codes 232 and 233, for example.

The code 232 defines a loop that increments a loop variable i from 5 to 10000 by 1. Also, a part prior to the loop defines three calculations: a(2)=a(1)+b(2), a(3)=a(2)+b(3), and a(4)=a(3)+b(4), which are peeled off from the loop and correspond to i=2 to 4. Moving first several iterations of calculation to a part prior to a loop is sometimes referred to as "loop peeling". Loop peeling of the code 232 is executed to prepare for transforming an arithmetic expression in a loop as in a code 233.

The code 233 defines an arithmetic expression a(i)=(((a(i−4)+b(i−3))+b(i−2))+b(i−1))+b(i) in the loop. The arithmetic expression of the code 233 is what the arithmetic expressions of the codes 231 and 232 are sequentially developed into with respect to the array variable a. That is, a(i−1) is developed into a(i−2)+b(i−1), and a(i−2) is developed into a(i−3)+b(i−2), and a(i−3) is developed into a(i−4)+b(i−3). This development removes the variables a(i−1), a(i−2), and a(i−3) set in immediately preceding three iterations, from the arithmetic expression for setting a(i).

Development of arithmetic expressions with respect to the array variable a is continued until difference (the number of iterations) on the timeline between the set variable a(i) and the referring variable a(i−n) becomes an SIMD width or more. Here, since the SIMD width is four, the arithmetic expression is developed until the referring variable becomes a(i−4). Also, an initial value of the loop variable i is decided in such a manner that the subscript i−n of the referring variable is the minimum value of the subscript of the array variable a. Here, the initial value of the loop variable i is decided to be 5, on the basis of i−4=1. Also, as a result of loop peeling, calculations corresponding to values of the loop variable i which are smaller than its initial value are defined prior to the loop. Here, since the initial value of the loop variable i is 5, calculations corresponding to i=2 to 4 are defined prior to the loop.

The code 234 defines a loop that increments a loop variable i from 5 to 10000 by 4, and an arithmetic expression a(i:i+3)=(((a(i−4:i−1)+b(i−3:i))+b(i−2:i+1))+b(i−1:i+2))+b(i:i+3) in the loop. The arithmetic expression of the code 234 is an SIMD instruction transformed from the arithmetic expressions of the code 233.

Figure 12:
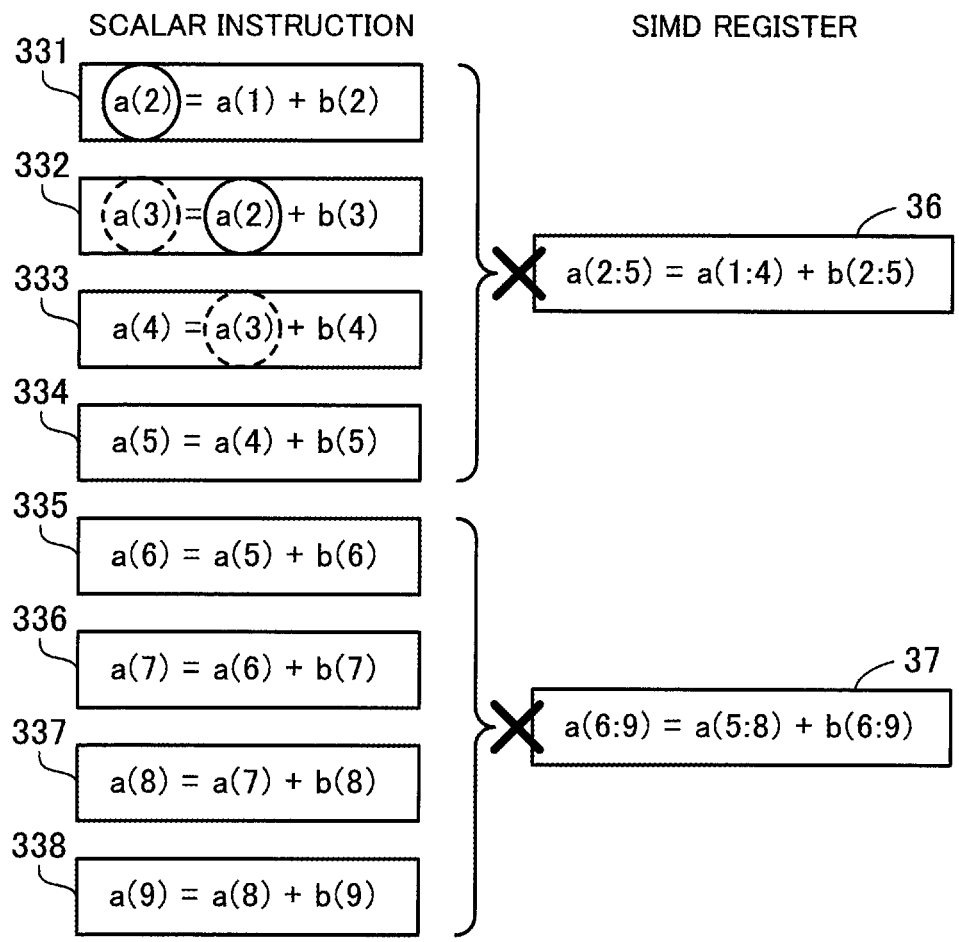
FIG. 12 illustrates an example of an obstructive factor against SIMD transformation.

FIG. 12 illustrates an example of obstructive factors of SIMD transformation. In the following, an arithmetic expression is not developed as in the development from the code 232 to the code 233, but the code 231 is transformed into an SIMD instruction by the same method as the method illustrated in FIGS. 5, 7, and 9.

When the loop of the code 231 is executed, a calculation 331 corresponding to i=2, that is, a(2)=a(1)+b(2) is executed first. Then, a calculation 332 corresponding to i=3, that is, a(3)=a(2)+b(3) is executed. Thereafter, a calculation 333 corresponding to i=4, a calculation 334 corresponding to i=5, a calculation 335 corresponding to i=6, a calculation 336 corresponding to i=7, a calculation 337 corresponding to i=8, and a calculation 338 corresponding to i=9 are executed.

Here, since calculations for setting a(i+1) refer to a(i), there is dependency between the calculations 331 to 334. For example, a(2) is set in the calculation 331 and referred to in the calculation 332. a(3) is set in the calculation 332 and referred to in the calculation 333. This dependency has the order of setting and referring, in which a(i) is first set and then referred to. If the calculations 331 to 334 are parallelized without development, their order is broken. For example, a(2) and a(3) are first referred to and then updated, if the calculations 331 to 334 are replaced by a calculation 36, a(2:5)=a(1:4)+b(2:5).

Thereby, if the calculations 331 to 334 are parallelized without development and transformed into the calculation 36, the transformation is incorrect due to its calculation method that is different from the original arithmetic expression. Likewise, there is dependency between calculations 335 to 338 with respect to the order of setting and referring. If the calculations 335 to 338 are replaced by a calculation 37, a(6:9)=a(5:8)+b(6:9), the order is broken. Thus, if the calculations 335 to 338 are parallelized without development and transformed into the calculation 37, the transformation is incorrect due to its calculation method that is different from the original arithmetic expression.

Figure 13:
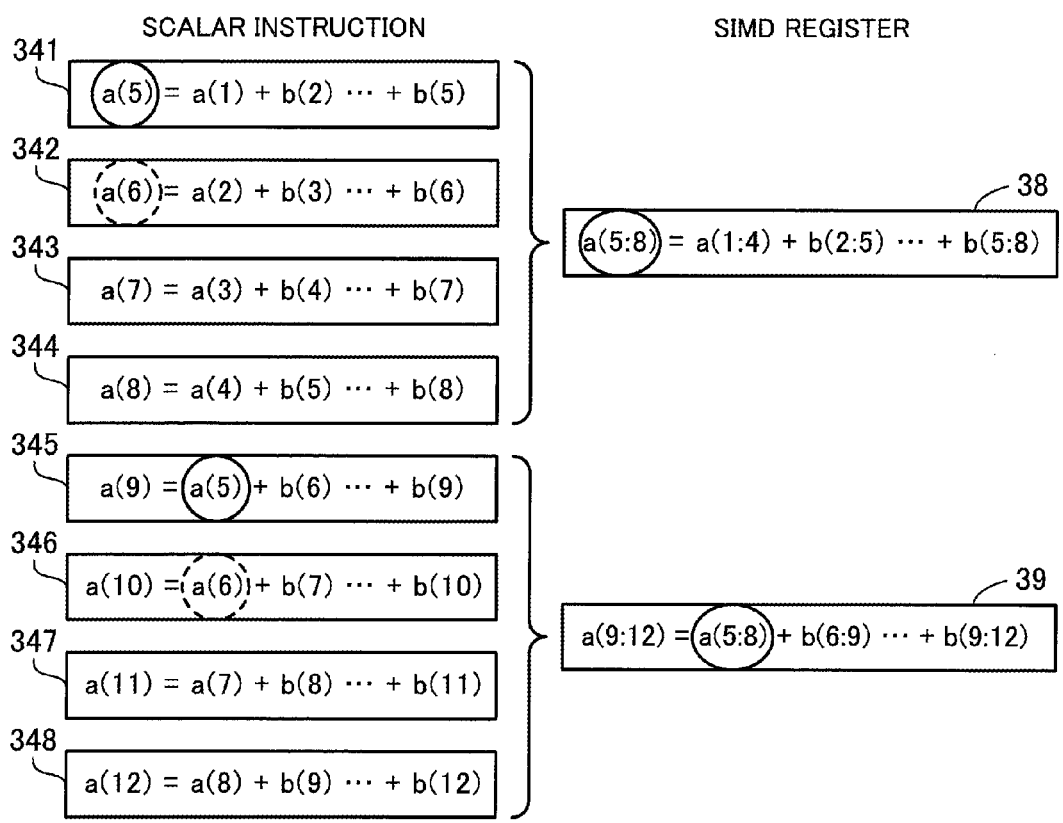
FIG. 13 illustrates fourth exemplary correspondence of calculations before and after SIMD transformation.

FIG. 13 illustrates fourth exemplary correspondence of calculations before and after SIMD transformation. To solve the above problem, the SIMD transformation unit 134 develops an arithmetic expression and transforms instructions to an SIMD instruction, as illustrated in FIG. 11. When the loop of the code 233 is executed, a calculation 341 corresponding to i=5, that is, a(5)=a(1)+b(2)+b(3)+b(4)+b(5) is executed first. Then, a calculation 342 corresponding to i=6, that is, a(6)=a(2)+b(3)+b(4)+b(5)+b(6) is executed. Thereafter, a calculation 343 corresponding to i=7, a calculation 344 corresponding to i=8, a calculation 345 corresponding to i=9, a calculation 346 corresponding to i=10, a calculation 347 corresponding to i=11, and a calculation 348 corresponding to i=12 are executed.

In contrast, when the loop of the code 234 is executed, a calculation 38 corresponding to i=5, that is, a(5:8)=a(1:4)+b(2:5)+b(3:6)+b(4:7)+b(5:8) is executed first. Then, a calculation 39 corresponding to i=9, that is, a(9:12)=a(5:8)+b(6:9)+b(7:10)+b(8:11)+b(9:12) is executed. The calculation 39 refers to a(5:8), and thus is dependent on the calculation 38.

Here, there is dependency between the calculations 341 to 348, in which a(i) is set and thereafter referred to. For example, a(5) is set in the calculation 341 and referred to in the calculation 345. However, a calculation that sets a(i) and a calculation that refers to a(i) are an SIMD width or more away from each other on the timeline. For example, the calculation 341 that sets a(5) and the calculation 345 that refers to a(5) are four loop iterations away from each other. The calculations 342 to 344 do not refer to a(5). Hence, the calculations 341 to 344 are parallelized and transformed into the calculation 38, using an SIMD instruction. In the same way, the calculations 345 to 348 are parallelized and transformed into the calculation 39, using an SIMD instruction.

FIG. 14 illustrates fifth exemplary code transformation by SIMD optimization. The above arithmetic expression of the code 234 includes four addition operators. In the code 234, these four additions are sequentially executed from forward to backward. Thereby, even when the CPU 20 includes a plurality of computing units capable of executing a plurality of SIMD instructions in parallel, the four additions of the code 234 are not parallelized. On the other hand, since addition of real numbers are under the associative law, the execution order of four additions can be changed. Thus, the SIMD transformation unit 134 may change the execution order of operators, to increase a degree of parallelism in one arithmetic expression.

The SIMD transformation unit 134 transforms the code 233 to a code 235, for example. The code 235 defines an arithmetic expression a(i)=(a(i−4)+(b(i−3)+b(i−2)))+(b(i−1)+b(i)) in a loop. This arithmetic expression is generated by changing the execution order of four additions from the code 233. In the code 235, the first addition is executed after the second addition among four additions, and the third addition is executed after the first and fourth additions. On the other hand, the first or second addition and the fourth addition can be executed in parallel. Thereby, the degree of parallelism in the arithmetic expression of the code 235 is higher than that in the code 233.

A code 236 defines a loop that increments the loop variable i from 5 to 10000 by 4, and an arithmetic expression a(i:i+3)=(a(i−4:i−1)+(b(i−3:i)+b(i−2:i+1)))+(b(i−1:i+2)+b(i:i+3)) in the loop. The arithmetic expression of the code 236 is an SIMD instruction transformed from the arithmetic expression of the code 235. When the CPU 20 includes a plurality of computing units capable of executing a plurality of SIMD instructions in parallel, the first or second addition and the fourth addition of the code 236 can be executed in parallel.

Note that, in the floating-point calculation by a processor, a rounding error can occur due to limitation of register length. Thus, even under the associative law, the calculation result fluctuates in some cases by changing the execution order of operators. Thus, in the second embodiment, the SIMD transformation unit 134 transforms the arithmetic expression as illustrated in FIG. 14, only when a compile option explicitly allows the execution order of operators to change.

Figure 15:
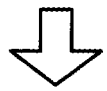
FIG. 15 illustrates sixth exemplary code transformation by SIMD optimization.

FIG. 15 illustrates sixth exemplary code transformation by SIMD optimization. The above description has illustrated an example of SIMD optimization of a code including a fixed length of the array variables a and b and fixed upper and lower limit values of the loop variable i. Note that SIMD optimization may be executed to a code including a parameterized length of the array variables a and b and parameterized upper and lower limit values of the loop variable i.

A code 241 defines double-precision floating-point array variables a and b having a length of n, a loop variable i, a loop that increments the loop variable i from 2 to m by 1, and an arithmetic expression a(i)=a(i−1)+b(i) in the loop. Values of parameters n and m are not decided until compilation, but decided by a time when the loop is executed. The SIMD transformation unit 134 transforms the code 241 to a following code 242, for example.

The code 242 defines a first loop that increments a loop variable i from 5 to (m÷4)×4 by 4, an arithmetic expression transformed into an SIMD instruction in the first loop, and calculations of three iterations corresponding to i=2 to 4 that is peeled off from the loop. In addition, the code 242 defines a second loop that increments a loop variable i from is to m by 1 (where "is" is the last value of i in the first loop), and an arithmetic expression that is not transformed into an SIMD instruction in the second loop. In addition, the code 242 defines a conditional branch that determines whether m is less than 7 and, if m is less than 7, skips the first loop. In this way, even if the length of the array variables a and b and the upper and lower limit values of the loop variable i are variable, the SIMD transformation unit 134 can execute SIMD optimization, using a conditional branch.

As described above, even if an arithmetic expression in a loop includes a variable that refers to a calculation result of a previous iteration, the SIMD transformation unit 134 develops the arithmetic expression in order to transform a plurality of iterations of calculation of the loop to an SIMD instruction. However, the development of the arithmetic expression can increase the number of instructions and the number of times of memory accesses. Hence, the execution efficiency of an arithmetic expression developed and transformed into an SIMD instruction is not necessarily higher than the execution efficiency of an arithmetic expression before development and transformation into an SIMD instruction.

For example, according to a simple register allocating method, the arithmetic expression of the code 231 of FIG. 11 is achieved by two load instructions, one addition instruction, and one store instruction. Thus, calculation of four loop iterations of the code 231 is achieved by sixteen instructions. On the other hand, the arithmetic expressions of the code 234 of FIG. 11 and the code 236 of FIG. 14 are achieved by five load instructions, four addition instructions, and one store instruction. Thus, calculation corresponding to four iterations of the original loop is achieved by 10 instructions. In this way, execution of instructions is reduced in number by the above SIMD optimization in many cases. However, from the following reason, execution efficiency does not necessarily become higher.

(1) Some CPU architecture takes a longer execution time (number of cycles) for an SIMD instruction than for scalar instructions. The length of the execution time for an SIMD instruction is dependent on CPU architecture. (2) Improvement by SIMD transformation may be small, when instructions are able to be scheduled to reduce an idle time of computing units without SIMD transformation, e.g., when the loop includes a large number of arithmetic expressions that are executable in parallel. (3) Increase of memory accesses might reduce effective efficiency. How much the execution efficiency is affected is dependent on CPU architecture and code. A larger SIMD width has a possibility of making the number of memory accesses to increase and have a larger influence. (4) Improvement by SIMD transformation may be small, when computing units in a CPU are few, and when an SIMD width is small.

Thus, the SIMD transformation unit 134 estimates the number of cycles indicating execution time of a code (for example, the code 231) before SIMD transformation, and the number of cycles indicating execution time of a code (for example, the code 234 and the code 236) after SIMD transformation, with respect to calculation in a loop. Then, the SIMD transformation unit 134 rewrites an intermediate code of the intermediate code memory unit 122, only when the latter number of cycles is smaller than the former number of cycles, that is, when execution efficiency is increased by SIMD transformation.

Figure 16:
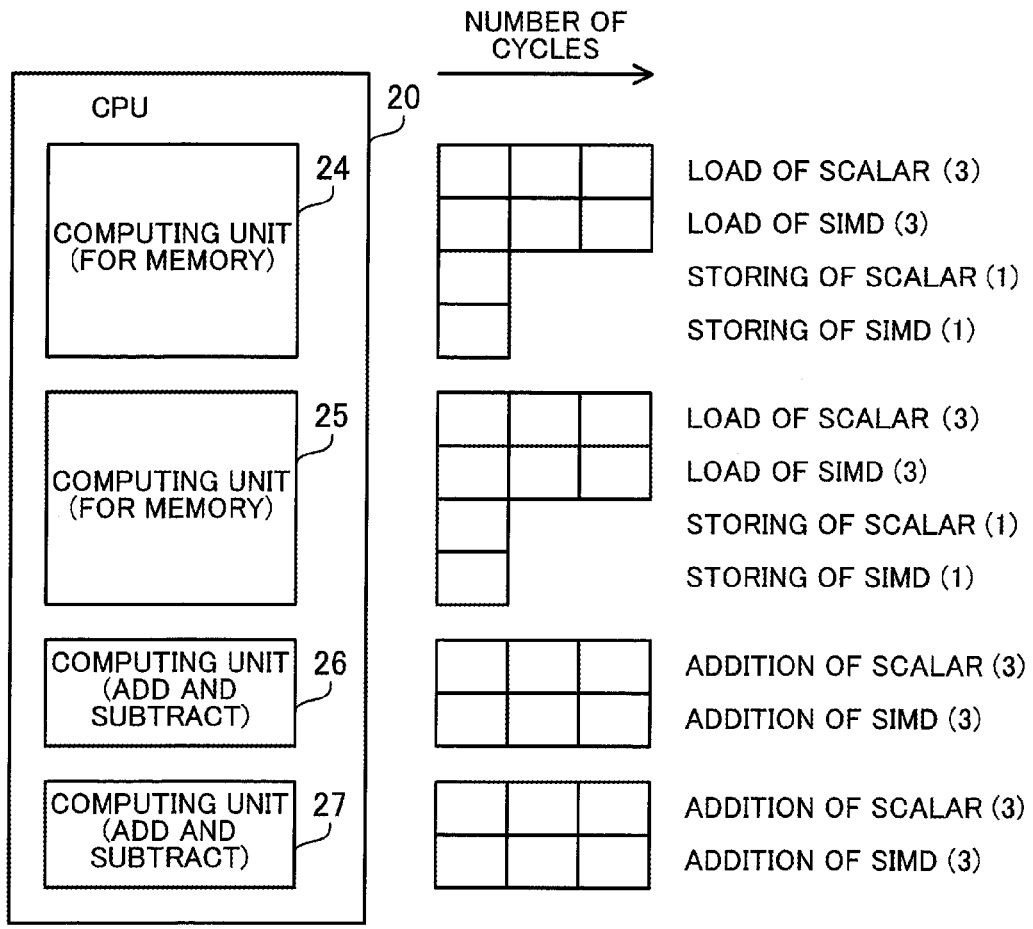
FIG. 16 illustrates an example of processor architecture.

FIG. 16 illustrates an example of processor architecture. In order to estimate the number of cycles for executing a loop, the SIMD transformation unit 134 refers to processor information indicating architecture of the target CPU 20. Processor information describes the number of computing units in the CPU 20, the number of cycles for executing various types of instructions, and other information. This processor information is stored in advance in the RAM 102 and the HDD 103, for example.

The CPU 20 includes computing units 24 to 27. The computing units 24 and 25 are each capable of executing a scalar load instruction, an SIMD load instruction having an SIMD width of four, a scalar store instruction, and an SIMD store instruction having an SIMD width of four. The computing units 26 and 27 are each capable of executing a scalar addition instruction, and an SIMD addition instruction having an SIMD width of four. The computing units 24 to 27 are pipeline processors. Thus, the computing units 24 to 27 are each capable of executing one instruction (one scalar instruction or one SIMD instruction) for each cycle.

The number of cycles in the pipeline from instruction input to instruction execution completion is different depending on a type of instruction. In the computing units 24 and 25, the scalar load instruction takes three cycles, and the SIMD load instruction takes three cycles, and the scalar store instruction takes one cycle, and the SIMD store instruction takes one cycle. In the computing units 26 and 27, the scalar addition instruction takes three cycles, and the SIMD addition instruction takes three cycles.

The computing units 24 to 27 are capable of executing instructions in parallel. Thus, four scalar or SIMD instructions can be input at maximum for each cycle. However, the maximum number of simultaneous reading out from a memory is two, while the maximum number of simultaneous writing into a memory is one. Hence, when one of the computing units 24 and 25 writes data in the memory in accordance with a store instruction, the other neither reads out data in accordance with a load instruction nor writes data in accordance with a store instruction. That is, the CPU 20 can execute one or two addition instructions and one or two load instructions simultaneously. Also, the CPU 20 can execute one or two addition instructions and one store instruction simultaneously.

FIG. 17 illustrates first exemplary calculation of the number of cycles of a loop. In the following, the CPU 20 of FIG. 16 executes an object code. Calculation of four loop iterations of the code 231 is scheduled as in FIG. 17.

At cycle #1, a load instruction for reading out b(i) is input. In FIG. 17, symbols such as t20 represent a scalar register that is not an SIMD register. At cycle #4, an addition instruction for adding a(i−1) and b(i), and a load instruction for reading out b(i+1) are input. At cycle #6, a load instruction for reading out b(i+2) is input. At cycle #7, a store instruction for writing a(i), and an addition instruction for adding a(i) and b(i+1) are input. With respect to a(i) that this addition instruction refers to, a(i) estimated at the last iteration is kept in the register (register t30) to forgo a load instruction for reading out a(i) from the memory.

At cycle #9, a load instruction for reading out b(i+3) is input. At cycle #10, a store instruction for writing a(i+1), and an addition instruction for adding a(i+1) and b(i+2) are input. At cycle #13, a store instruction for writing a(i+2), and an addition instruction for adding a(i+2) and b(i+3) are input. At cycle #16, a store instruction for writing a(i+3) is input. At cycle #17, an addition instruction for adding 4 to i is input. This estimation indicates that the calculation of four loop iterations takes eighteen cycles.

FIG. 18 illustrates second exemplary calculation of the number of cycles of a loop. Calculation of one loop iteration of the code 234 is scheduled as in FIG. 18.

At cycle #1, a load instruction for reading out a(i−4:i−1) and a load instruction for reading out b(i−3:i) are input. In FIG. 18, symbols such as ts1 and ts2 represent an SIMD register. At cycle #2, a load instruction for reading out b(i−2: i+1) and a load instruction for reading out b(i−1:i+2) are input. At cycle #3, a load instruction for reading out b(i:i+3) is input. Here, since b(i−2), b(i−1), b(i), b(i+1), and b(i+2) are stored in different SIMD registers redundantly, these variables are read out from a memory two or more times by two or more SIMD instructions.

At cycle #4, an addition instruction for adding a(i−4:i−1) and b(i−3:i) is input. This addition instruction is an SIMD instruction and corresponds to four scalar addition instructions. At cycle #7, an addition instruction for adding the calculation result of cycle #4 and b(i−2:i+1) is input. At cycle #10, an addition instruction for adding the calculation result of cycle #7 and b(i−1:i+2) is input. At cycle #13, an addition instruction for adding the calculation result of cycle #10 and b(i:i+3) is input. At cycle #16, a store instruction for writing a(i:i+3) is input. At cycle #17, an addition instruction for adding 4 to i is input. This estimation indicates that the calculation of one loop iteration after transformation takes eighteen cycles.

In the arithmetic expression of the code 234, four additions are sequentially executed. Hence, as illustrated in FIG. 18, parallel processing capability of the CPU 20 is not utilized in cycles #4 to #15, resulting in increased idle time of the computing units 24 to 26. As a result, the estimated number of cycles of the code 234 is same as the estimated number of cycles of the code 231, and thus the execution efficiency is not improved.

Figure 19:
FIG. 19 illustrates third exemplary calculation of the number of cycles of a loop.

FIG. 19 illustrates third exemplary calculation of the number of cycles of a loop. Calculation of one loop iteration of the code 236 is scheduled as in FIG. 19.

At cycle #1, a load instruction for reading out b(i−3:i), and a load instruction for reading out b(i−2:i+1) are input. At cycle #2, a load instruction for reading out b(i−1:i+2), and a load instruction for reading out b(i:i+3) are input. At cycle #3, a load instruction for reading out a(i−4:i−1) is input. At cycle #4, an addition instruction for adding b(i−3:i) and b(i−2:i+1) is input. At cycle #5, an addition instruction for adding b(i−1:i+2) and b(i:i+3) is input. Since the second and fourth additions of the arithmetic expression do not have dependency, the addition instruction of cycle #5 is input before acquiring the result of cycle #4.

At cycle #7, an addition instruction for adding a(i−4:i−1) and the calculation result of cycle #4 is input. At cycle #10, an addition instruction for adding the calculation result of cycle #7 and the calculation result of cycle #5 is input. At cycle #13, a store instruction for writing a(i:i+3) is input. At cycle #14, an addition instruction for adding 4 to i is input. This estimation indicates that the calculation of one loop iteration after transformation takes fifteen cycles.

The arithmetic expression of the code 236 has a higher degree of parallelism than the arithmetic expression of the code 234. Hence, SIMD instructions can also utilize the parallel processing capability of the CPU 20. As a result, the estimated number of cycles of the code 236 is smaller than the estimated number of cycles of the code 231, and thus the execution efficiency is improved. In this case, the SIMD transformation unit 134 decides to replace the code 231 with the code 236.

In FIGS. 18 and 19, all SIMD width (i.e., four) of the CPU 20 is utilized to execute calculation corresponding to four scalar instructions, with one SIMD instruction. In contrast, only a part of the SIMD width may be utilized. For example, even when an SIMD width of the CPU 20 is four, the number of calculations that are executed in parallel with one SIMD instruction may be limited to two. When a load of memory access is large, the number of calculations executed in parallel with one SIMD instruction (multiplicity) may be limited. In that case, for example, the SIMD transformation unit 134 may calculate an estimated number of cycles with respect to different multiplicities and select the multiplicity having the minimum estimated number of cycles.

Figure 20:
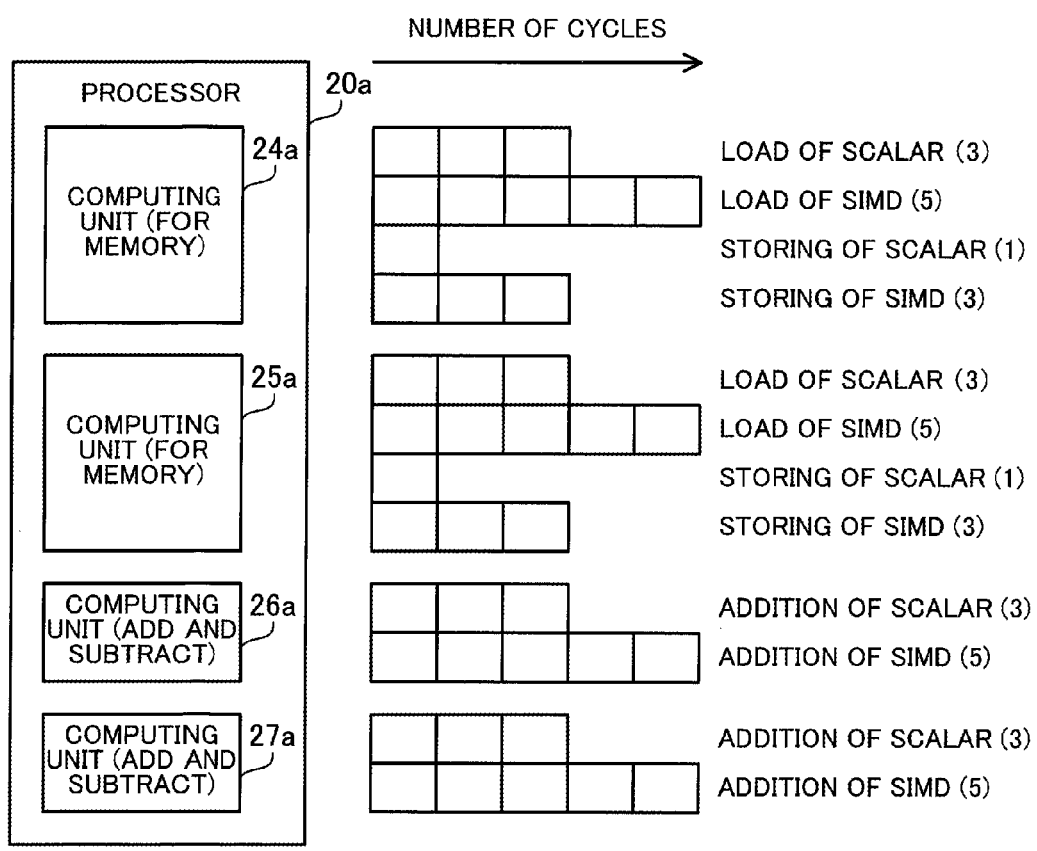
FIG. 20 illustrates another example of processor architecture.

Next, influence that different CPU architectures have on the number of cycles will be described. FIG. 20 illustrates another example of processor architecture.

A CPU 20a includes computing units 24a to 27a. The computing units 24a and 25a are each capable of executing a scalar load instruction, an SIMD load instruction having an SIMD width of four, a scalar store instruction, and an SIMD store instruction having an SIMD width of four. The computing units 26a and 27a are each capable of executing a scalar addition, and an SIMD addition instruction having an SIMD width of four.

The number of cycles from instruction input to instruction execution completion is different from that of the CPU 20 illustrated in FIG. 16. In the computing units 24a and 25a, the scalar load instruction takes three cycles, and the SIMD load instruction takes five cycles, and the scalar store instruction takes one cycle, and the SIMD store instruction takes three cycles. In the computing units 26a and 27a, the scalar addition instruction takes three cycles, and the SIMD addition instruction takes five cycles. That is, as opposed to the CPU 20, the number of cycles that an SIMD instruction takes to be executed is larger than the number of cycles that a scalar instruction takes to be executed.

FIG. 21 illustrates fourth exemplary calculation of the number of cycles of a loop. In the following example, the CPU 20a of FIG. 20 executes an object code. Calculation of one loop iteration of the code 236 is scheduled as in FIG. 21.

At cycle #1, a load instruction for reading out b(i−3:i) and a load instruction for reading out b(i−2:i+1) are input. At cycle #2, a load instruction for reading out b(i−1:i+2) and a load instruction for reading out b(i:i+3) are input. At cycle #3, a load instruction for reading out a(i−4:i−1) is input. At cycle #6, an addition instruction for adding b(i−3:i) and b(i−2:i+1) is input. At cycle #7, an addition instruction for adding b(i−1:i+2) and b(i:i+3) is input.

At cycle #11, an addition instruction for adding a(i−4:i−1) and a calculation result of cycle #6 is input. At cycle #16, an addition instruction for adding a calculation result of cycle #11 and a calculation result of cycle #7 is input. At cycle #21, a store instruction for writing a(i:i+3) is input. At cycle #22, an addition instruction for adding 4 to i is input. This estimation indicates that the calculation of one loop iteration after transformation takes twenty three cycles.

The target CPU 20a takes a long time to execute an SIMD instruction. Hence, as illustrated in FIG. 21, parallel processing capability of the CPU 20a is not utilized in cycles #8 to #20, increasing idle time of the computing units 24a to 27a. As a result, the estimated number of cycles of the code 236 is larger than the estimated number of cycles of the code 231, deteriorating execution efficiency.

Next, influence that difference of original codes has on improvement of SIMD transformation will be described. FIG. 22 illustrates fifth exemplary calculation of the number of cycles of a loop.

A code 251 is an code before SIMD transformation. The code 251 defines a loop that increments a loop variable i from 2 to 10000 by 1. In the loop, the next three arithmetic expressions are defined: a1(i)=a1(i−1)+b1(i), a2(i)=a2(i−1)+b2(i), and a3(i)=a3(i−1)+b3(i).

In this example, the CPU 20 of FIG. 16 executes an object code. Calculation of four loop iterations of the code 251 is scheduled as in FIG. 22.

At cycle #1, a load instruction for reading out b1(i) and a load instruction for reading out b1(i+2) are input. At cycle #2, a load instruction for reading out b2(i) and a load instruction for reading out b2(i+2) are input. At cycle #3, a load instruction for reading out b3(i) and a load instruction for reading out b3(i+2) are input. At cycle #4, a load instruction for reading out b1(i+1), a load instruction for reading out b1(i+3), and an addition instruction of a1(i−1)+b1(i) are input. At cycle #5, a load instruction for reading out b2(i+1), a load instruction for reading out b2(i+3), and an addition instruction of a2(i−1)+b2(i) are input. At cycle #6, a load instruction for reading out b3(i+1), a load instruction for reading out b3(i+3), and an addition instruction of a3(i−1)+b3(i) are input.

At cycle #7, a store instruction for writing a1(i) and an addition instruction of a1(i)+b1(i+1) are input. At cycle #8, a store instruction for writing a2(i) and an addition instruction of a2(i)+b2(i+1) are input. At cycle #9, a store instruction for writing a3(i) and an addition instruction of a3(i)+b3(i+1) are input. At cycle #10, a store instruction for writing a1(i+1) and an addition instruction of a1(i+1)+b1(i+2) are input. At cycle #11, a store instruction for writing a2(i+1) and an addition instruction of a2(i+1)+b2(i+2) are input. At cycle #12, a store instruction for writing a3(i+1) and an addition instruction of a3(i+1)+b3(i+2) are input.

At cycle #13, a store instruction for writing a1(i+2) and an addition instruction of a1(i+2)+b1(i+3) are input. At cycle #14, a store instruction for writing a2(i+2) and an addition instruction of a2(i+2)+b2(i+3) are input. At cycle #15, a store instruction for writing a3(i+2) and an addition instruction of a3(i+2)+b3(i+3) are input. At cycle #16, a store instruction for writing a1(i+3) is input. At cycle #17, a store instruction for writing a2(i+3) is input. At cycle #18, a store instruction for writing a3(i+3) is input. At cycle #19, an addition instruction of i+4 is input. This estimation indicates that the calculation of four loop iterations takes twenty cycles.

A loop of the code 251 includes three arithmetic expressions that have no dependency therebetween. Hence, scalar instructions are densely scheduled to reduce idle times of the computing units 24 to 26.

FIG. 23 illustrates sixth exemplary calculation of the number of cycles of a loop. The code 252 is an SIMD instruction transformed from the code 251. The code 252 defines a loop that increments a loop variable i from 5 to 10000 by 4. The loop defines the next three arithmetic expressions:

$$a1(i:i+3)=(a1(i-4:i-1)+(b1(i-3:i)+b1(i-2:i+1)))+(b1(i-1:i+2)+b1(i:i+3)),$$

$$a2(i:i+3)=(a2(i-4:i-1)+(b2(i-3:i)+b2(i-2:i+1)))+(b2(i-1:i+2)+b2(i:i+3)), \text{ and}$$

$$a3(i:i+3)=(a3(i-4:i-1)+(b3(i-3:i)+b3(i-2:i+1)))+(b3(i-1:i+2)+b3(i:i+3)).$$

In the following, the CPU 20 of FIG. 16 executes an object code. Calculation of one loop iteration of the code 252 is scheduled as in FIG. 23.

At cycle #1, a load instruction for reading out b1(i−3:i) and a load instruction for reading out b1(i−2:i+1) are input. At cycle #2, a load instruction for reading out b2(i−3:i) and a load instruction for reading out b2(i−2:i+1) are input. At cycle #3, a load instruction for reading out b3(i−3:i) and a load instruction for reading out b3(i−2:i+1) are input. At cycle #4, a load instruction for reading out b1(i−1:i+2) and a load instruction for reading out b1(i:i+3) are input. At cycle #5, a load instruction for reading out b2(i−1:i+2) and a load instruction for reading out b2(i:i+3) are input. At cycle #6, a load instruction for reading out b3(i−1:i+2) and a load instruction for reading out b3(i:i+3) are input.

At cycle #7, a load instruction for reading out a1(i−4:i−1), an addition instruction of b1(i−3:i)+b1(i−2:i+1), and an addition instruction of b1(i−1:i+2)+b1(i:i+3) are input. At cycle #8, a load instruction for reading out a2(i−4:i−1), an addition instruction of b2(i−3:i)+b2(i−2:i+1), and an addition instruction of b2(i−1:i+2)+b2(i:i+3) are input. At cycle #9, a load instruction for reading out a3(i−4:i−1), an addition instruction of b3(i−3:i)+b3(i−2:i+1), and an addition instruction of b3(i−1:i+2)+b3(i:i+3) are input.

At cycle #10, an addition instruction for adding a1(i−4:i−1) and a calculation result of cycle #7 is input. At cycle #11, an addition instruction for adding a2(i−4:i−1) and a calculation result of cycle #8 is input. At cycle #12, an addition instruction for adding a3(i−4:i−1) and a calculation result of cycle #9 is input. At cycle #13, an addition instruction for adding a calculation result of cycle #10 and a calculation result of cycle #7 is input. At cycle #14, an addition instruction for adding a calculation result of cycle #11 and a calculation result of cycle #8 is input. At cycle #15, an addition instruction for adding a calculation result of cycle #12 and a calculation result of cycle #9 is input.

At cycle #16, a store instruction for writing a1(i:i+3) is input. At cycle #17, a store instruction for writing a2(i:i+3) is input. At cycle #18, a store instruction for writing a3(i:i+3) is input. At cycle #19, an addition instruction of i+4 is input. This estimation indicates that the calculation of one loop iteration after transformation takes twenty cycles. As illustrated in FIG. 23, although SIMD instructions of the code 252 is densely scheduled, the scheduling efficiency of the code 251 before transformation is high. Hence, the estimated number of cycles of the code 252 is same as the estimated number of cycles of the code 251, resulting in unimproved execution efficiency.

Figure 24:
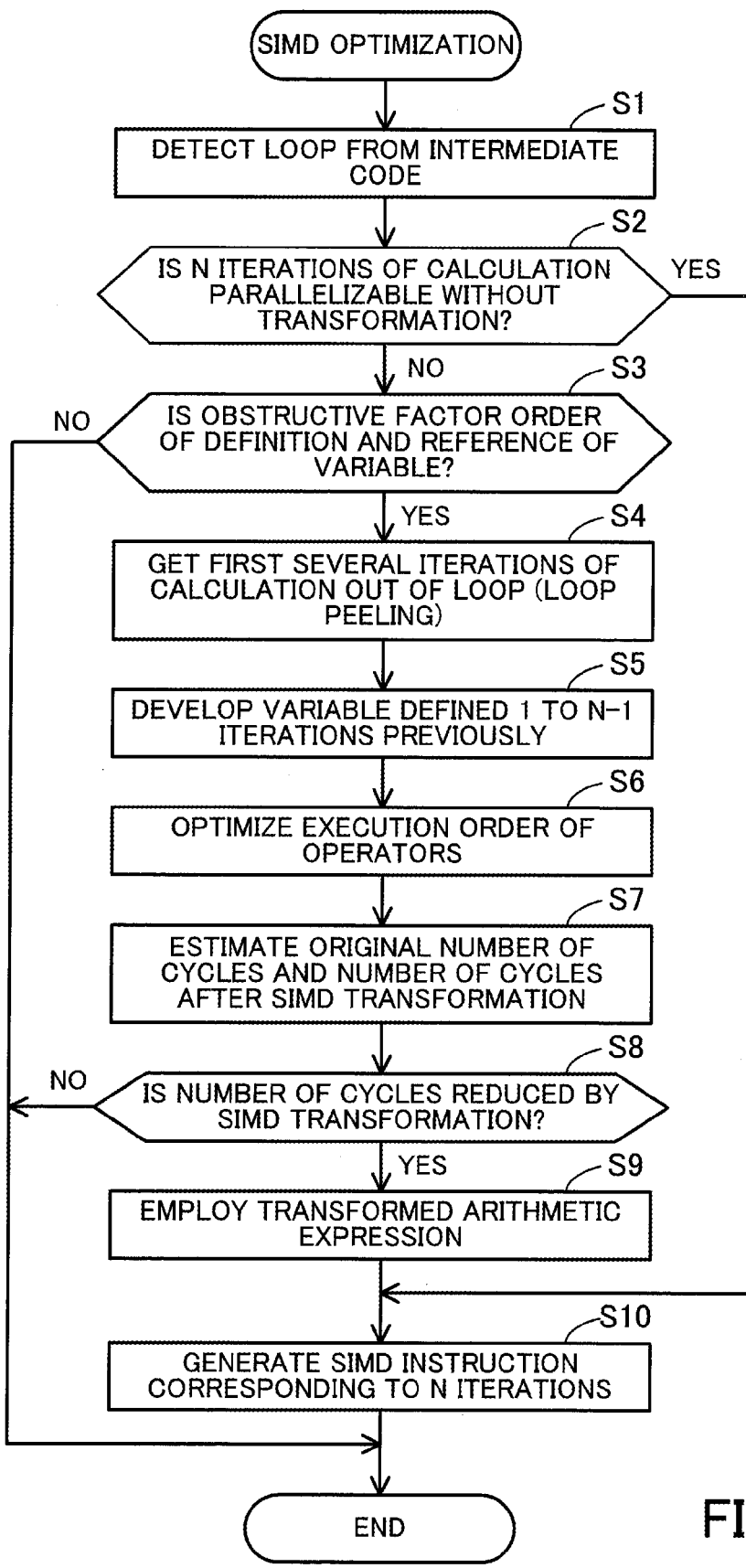
FIG. 24 is a flowchart illustrating an exemplary procedure of SIMD optimization.

Next, an exemplary procedure of SIMD optimization executed by SIMD transformation unit 134 will be described. FIG. 24 is a flowchart illustrating an exemplary procedure of SIMD optimization.

(S1) The SIMD transformation unit 134 reads out an intermediate code from the intermediate code memory unit 122, and detects a loop from the intermediate code. The loop includes one or more arithmetic expressions.

(S2) The SIMD transformation unit 134 confirms an SIMD width N of the architecture of a target CPU. For example, the SIMD transformation unit 134 confirms an SIMD width N, with reference to processor information stored in advance in the RAM 102 or the HDD 103. The type of the target CPU may be selected as a compile option, when compiling a code.

The SIMD transformation unit 134 determines whether calculations of N loop iterations are parallelizable without transforming its arithmetic expression. If simultaneous calculation of N iterations does not change the order of setting and referring of variables, the SIMD transformation unit 134 determines that calculations of N loop iterations are parallelizable. On the other hand, if such simultaneous calculation changes or has the possibility of changing the order of setting and referring of variables, the SIMD transformation unit 134 determines that calculations of N loop iterations are not parallelizable.

For example, when the arithmetic expression includes a variable that refers to 1 to N−1 iterations previous calculation result, the SIMD transformation unit 134 determines that calculations of N loop iterations are not parallelizable. Also, when the arithmetic expression includes a variable that refers to a previous calculation result whose iteration is not identifiable statically (indirect access), the SIMD transformation unit 134 determines that calculations of N loop iterations are not parallelizable. Also, when the loop includes a call for a user function, or when the process has a possibility of going out of the loop in the middle of the loop, the SIMD transformation unit 134 determines that calculations of N loop iterations are not parallelizable. If calculations of N loop iterations are parallelizable, the process proceeds to step S10. On the other hand, if calculations of N loop iterations are not parallelizable, the process proceeds to step S3.

(S3) The SIMD transformation unit 134 determines whether an obstructive factor against SIMD transformation (the cause that makes calculations in a loop non-parallelizable) is the order of setting and referring of variables. That is, the SIMD transformation unit 134 determines whether a variable that refers to 1 to N−1 iterations previous calculation result is the only obstructive factor. If this condition is satisfied, the process proceeds to step S4. On the other hand, if the condition is not satisfied, the SIMD optimization ends.

(S4) The SIMD transformation unit 134 executes loop peeling. That is, the SIMD transformation unit 134 inserts an arithmetic expression immediately before the loop, so that calculations of first several iterations of the loop are executed outside the loop. For example, the SIMD transformation unit 134 calculates how much difference between the subscript of an array variable that is set and the subscript of an array variable that is referred allows parallelization, on the basis of the SIMD width N. Then, the SIMD transformation unit 134 decides how many iterations of calculation are to be peeled off from the loop, on the basis of the subscript of the referred array variable and an initial value of a loop variable i in the arithmetic expression after transformation.

(S5) The SIMD transformation unit 134 develops a variable that is included in the arithmetic expression and refers to 1 to N−1 iterations previous calculation result, using the arithmetic expression itself. The development of the variable is continued until a variable that refers to 1 to N−1 iterations previous calculation result is removed from the arithmetic expression. For example, when the original arithmetic expression includes a variable that refers to one iteration previous calculation result, the development of the variable is repeatedly executed N−1 times, in order to obtain an arithmetic expression not including a variable that refers to 1 to N−1 iterations previous calculation results.

(S6) The SIMD transformation unit 134 confirms whether a compile option that allows change of calculation order is included in the compile command. If such a compile option is included, the SIMD transformation unit 134 optimizes the execution order of operators included in the arithmetic expression after development. For example, the SIMD transformation unit 134 confirms the type and number of computing units in the target CPU, with reference to processor information. If the target CPU is able to execute two or more SIMD instructions in parallel, the SIMD transformation unit 134 changes the execution order of operators to make parallelization easier.

(S7) The SIMD transformation unit 134 provisionally schedules instructions on the basis of the description of the original loop, and estimates the number of cycles for executing calculation of N iterations without using SIMD instructions. Also, the SIMD transformation unit 134 provisionally schedules instructions on the basis of the description of the loop after transformation of steps S5 and S6, and estimates the number of cycles for executing calculation corresponding to N iterations of the original loop using SIMD instructions.

(S8) The SIMD transformation unit 134 determines whether the estimated number of cycles after SIMD transformation is smaller than the estimated number of cycles before SIMD transformation, that is, whether SIMD transformation makes calculation of the loop more efficient. If a reduced number of cycles is estimated, the process proceeds to step S9. On the other hand, if a reduced number of cycles is not estimated, the SIMD optimization ends.

(S9) The SIMD transformation unit 134 employs the arithmetic expression transformed in steps S5 and S6.

(S10) The SIMD transformation unit 134 generates an SIMD instruction that executes calculations of N loop iterations in one iteration, from the arithmetic expression determined to be parallelizable in step S2 or the arithmetic expression after transformation employed in step S9. Then, the SIMD transformation unit 134 rewrites the intermediate code stored in the intermediate code memory unit 122, to replace it with a code including the SIMD instruction. That is, several scalar instructions included in the intermediate code are transformed into an SIMD instruction. This SIMD optimization generates an object code including an SIMD instruction.

FIG. 25 illustrates an exemplary code that is not determined to be parallelizable. The arithmetic expression that is determined to be non-parallelizable in step S2 is, for example, an arithmetic expression including an array variable that is accessed indirectly. The code 261 defines double-precision floating-point array variables a, b, idx1, and idx2 each having a length of 10000, and a loop that increments a loop variable i from 1 to 10000 by 1. The loop defines an arithmetic expression a(idx1(i))=a(idx2(i))+b(i). The array variable idx1 indicates which element of the array variable a in the calculation of i-th loop iteration is to be set. The array variable idx2 indicates which element of the array variable a in the calculation of i-th loop iteration is to be referred. In the code 261, in the calculation of i-th loop iteration, the element of the array variable a to be referred and the element of the array variable a to be set is not statically decided, but is decided when executing the code 261. Hence, whether or not 1 to N−1 iterations previous calculation result is referred is determined when compiling the code. Thus, the loop of the code 261 is determined to be non-parallelizable. Note that, with respect to the code 261, determination of above step S3 results in NO, and SIMD optimization is not executed.

According to the compiler apparatus 100 of the second embodiment, an arithmetic expression in a loop is developed so as not to refer to 1 to N−1 iterations previous calculation result, where N is an SIMD width. Thereby, even when the original calculation in a loop is unable to be transformed into an SIMD instruction, the developed calculation is able to be transformed into an SIMD instruction. Also, the number of cycles estimated when an arithmetic expression is not transformed into an SIMD instruction is compared with the number of cycles estimated when an arithmetic expression is developed and transformed into an SIMD instruction, in order to decide whether or not to transform an arithmetic expression to an SIMD instruction. Thereby, increase of the number of instructions and memory accesses due to development of an arithmetic expression and decrease of the number of instructions due to transformation into an SIMD instruction are totally assessed to improve execution efficiency of a loop.

Also, the number of cycles is estimated with reference to processor information indicating architecture of a target CPU, in order to appropriately determine whether or not to execute SIMD optimization in view of the architecture of the target CPU as well. Also, when permitted by a user, the execution order of operators is optimized in a developed arithmetic expression, in order to reduce the number of cycles for executing a loop.

As described above, information processing of the first embodiment is achieved by causing the compiler apparatus 10 to execute a program. Information processing of the second embodiment is achieved by causing the compiler apparatus 100 to execute a program.

A program may be stored in a computer-readable storage medium (for example, the storage medium 113). Such storage medium is, for example, a magnetic disk, an optical disc, a magneto-optical disk, or a semiconductor memory. The magnetic disk includes an FD and an HDD. The optical disc includes a CD, a CD-R (Recordable)/RW (Rewritable), a DVD, and a DVD-R/RW. A program may be stored in a portable storage medium for the purpose of distribution. In that case, the program may be duplicated or installed from a portable storage medium to another storage medium, such as an HDD (for example, the HDD 103), in order to be executed. In one aspect, a loop in a code is executed in a shorter time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A non-transitory computer-readable storage medium storing a computer program that causes a computer to perform a procedure comprising:
  detecting a loop from a first code;
  transforming a first arithmetic expression included in the loop and including a first variable that refers to a result of K iterations of a previous calculation, into a second arithmetic expression not including the first variable, using a second variable that refers to a result of K+1 iterations or more of the previous calculation, wherein K is an integer that is equal to or greater than 1;

comparing a first execution time for executing the loop on the basis of the first arithmetic expression with a second execution time for executing the loop in which a calculation of Jth iteration of the loop and a calculation of J+Kth iteration of the loop are executed in parallel on the basis of the second arithmetic expression, wherein J is an integer that is equal to or greater than 1;

deciding, based on a result of the comparing, whether to transform the first code into a second code including a parallel processing instruction for executing the calculation of the Jth iteration of the loop and the calculation of the J+Kth iteration of the loop in parallel; and responsive to the deciding to transform the first code into the second code including the parallel processing instruction, transforming the first code into the second code including the parallel processing instruction.

2. The non-transitory computer-readable storage medium according to claim 1, wherein the second arithmetic expression includes a plurality of operators, and the procedure further includes generating, when changing an execution order of the plurality of operators shortens the second execution time, the second code on the basis of the second arithmetic expression in which the execution order is changed.

3. The non-transitory computer-readable storage medium according to claim 1, wherein the procedure further includes estimating the second execution time, using processor information indicating a number of cycles that a processor uses to execute the parallel processing instruction.

4. A compiler method comprising:

detecting, by a processor, a loop from a first code;

transforming, by the processor, a first arithmetic expression included in the loop and including a first variable that refers to a result of K iterations of a previous calculation, into a second arithmetic expression not including the first variable, using a second variable that refers to a result of K+1 iterations or more of the previous calculation, wherein K is an integer that is equal to or greater than 1;

comparing, by the processor, a first execution time for executing the loop on the basis of the first arithmetic expression with a second execution time for executing the loop in which a calculation of Jth iteration of the loop and a calculation of J+Kth iteration of the loop are executed in parallel on the basis of the second arithmetic expression, wherein J is an integer that is equal to or greater than 1;

deciding, by the processor, based on a result of the comparing, whether to transform the first code into a second code including a parallel processing instruction for executing the calculation of the Jth iteration of the loop and the calculation of the J+Kth iteration of the loop in parallel; and responsive to the deciding to transform the first code into the second code including the parallel processing instruction, transforming, by the processor the first code into the second code including the parallel processing instruction.

5. A compiler apparatus comprising:

a memory configured to store a first code including a loop having a first arithmetic expression including a first variable that refers to a result of K iterations of a previous calculation, wherein K is an integer that is equal to or greater than 1; and a processor configured to perform a procedure including:

transforming the first arithmetic expression into a second arithmetic expression not including the first variable, using a second variable that refers to a result of K+1 iterations or more of the previous calculation;

comparing a first execution time for executing the loop on the basis of the first arithmetic expression with a second execution time for executing the loop in which a calculation of Jth iteration of the loop and a calculation of J+Kth iteration of the loop are executed in parallel on the basis of the second arithmetic expression, wherein J is an integer that is equal to or greater than 1;

deciding, based on a result of the comparing, whether to transform the first code into a second code including a parallel processing instruction for executing the calculation of the Jth iteration of the loop and the calculation of the J+Kth iteration of the loop in parallel; and responsive to the deciding to transform the first code into the second code including the parallel processing instruction, transforming the first code into the second code including the parallel processing instruction.

* * * * *